(12) United States Patent  (10) Patent No.: US 8,704,888 B2
Nakagome  (45) Date of Patent: Apr. 22, 2014

(54) IMAGING DEVICE AND IMAGE ANALYSIS METHOD

(75) Inventor: Kouichi Nakagome, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 96 days.

(21) Appl. No.: 13/565,031

(22) Filed: Aug. 2, 2012

(65) Prior Publication Data

US 2013/0038718 A1  Feb. 14, 2013

(30) Foreign Application Priority Data

Aug. 8, 2011 (JP) ................................. 2011-172877

(51) Int. Cl.
H04N 7/18 (2006.01)
G06T 7/20 (2006.01)
G06T 7/00 (2006.01)

(52) U.S. Cl.
CPC ......... G06T 7/20 (2013.01); *G06T 2207/30224* (2013.01); *G06T 2207/30241* (2013.01); *G06T 2207/30221* (2013.01); *G06T 7/0097* (2013.01)
USPC ........................................................ 348/135

(58) Field of Classification Search
CPC ........... G06T 2207/30224; G06T 2207/30241; G06T 7/20; G06T 7/0097; G06T 2207/30221
USPC .................. 348/135, 157, 169–172
See application file for complete search history.

(56) References Cited

U.S. PATENT DOCUMENTS 5,189,711 A * 2/1993 Weiss et al. .................... 382/203
5,982,912 A 11/1999 Fukui et al.
7,612,800 B2 11/2009 Okada et al.
2006/0008116 A1 * 1/2006 Kiraly et al. .................. 382/103
2009/0201383 A1 8/2009 Slavin

FOREIGN PATENT DOCUMENTS

| JP | 7-286837 A | 10/1995 |
| JP | 10-186474 A | 7/1998 |
| JP | 2001-264016 A | 9/2001 |
| JP | 3279913 B2 | 4/2002 |
| JP | 2004-032460 A | 1/2004 |
| JP | 2004-096504 A | 3/2004 |
| JP | 2005-291824 A | 10/2005 |
| JP | 2008-058221 A | 3/2008 |

(Continued)

OTHER PUBLICATIONS

English translation of JP2008060974A.*

*Primary Examiner* — Mehrdad Dastouri
*Assistant Examiner* — Mohammed Rahaman
(74) *Attorney, Agent, or Firm* — Holtz, Holtz, Goodman & Chick, PC

(57) ABSTRACT

An imaging device includes a separability calculating portion for calculating a separability of a frame image by filtering the frame image containing a ball image elliptically deformed using an ellipse separability filter having an inside region and an outside region located outside of the inside region, an estimating portion for estimating a set of a center position, major axis, minor axis and inclination angle of the inside region, the set resulting in a maximum separability by changing the center position, major axis, minor axis and inclination angle of the inside region, as a set of a center position, major axis, minor axis and inclination angle of the ball image, and a speed calculating portion for calculating a speed of the ball based on a difference between the center positions of the ball images estimated by the estimating portion, a number of frames between the frame images and a frame rate.

9 Claims, 29 Drawing Sheets

(56) References Cited

FOREIGN PATENT DOCUMENTS

| | | | |
|---|---|---|---|
| JP | 2008-060974 A | 3/2008 | |
| JP | 2008-060982 A | 3/2008 | |
| JP | 2008060974 A * | 3/2008 | ............. H04N 5/225 |
| JP | 2008-085552 A | 4/2008 | |
| JP | 2008-186368 A | 8/2008 | |
| JP | 2008-236124 A | 10/2008 | |
| JP | 2009-189005 A | 8/2009 | |
| JP | 2010-068062 A | 3/2010 | |
| JP | 2010-118039 A | 5/2010 | |

* cited by examiner

FIG. 10
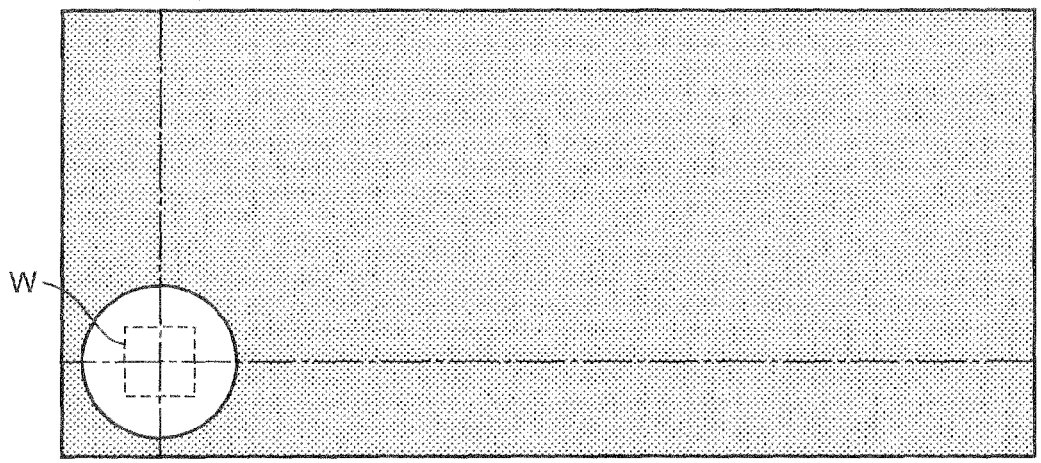
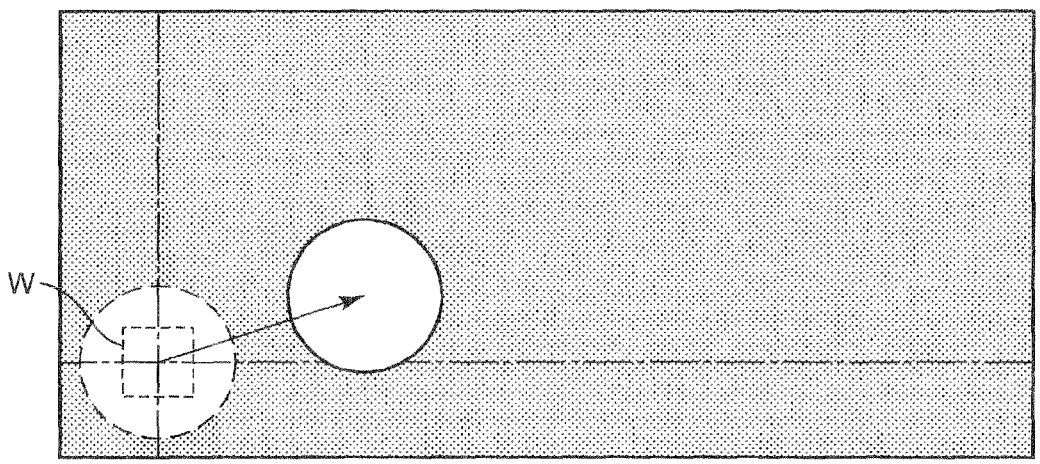

IMAGING DEVICE AND IMAGE ANALYSIS METHOD

BACKGROUND OF THE INVENTION

1. Field of the Invention

The present invention relates to an imaging device (image pickup device) and an image analysis method that can analyze a movement of a ball from an image in a frame captured by an image pickup means using a rolling shutter system.

2. Description of Related Art

A speed-gun is well known as a device for measuring a speed of a ball used for a sport such as baseball, tennis, and the like.

A speed-gun measures the Doppler effect of reflected waves from a ball, for example, and estimates a ball speed. Therefore, such a speed-gun has to be placed along a movement direction of the ball and thus there is high risk of collision with the ball. In addition, there is a problem that it is difficult to confirm at which position of the moving ball the speed was measured.

For the purpose of avoiding such a collision with a ball, a method for measuring a speed of a moving ball by capturing an image of a ball from a direction orthogonal to the moving direction and analyze the image is disclosed (JP2001-264016A, Patent Document 1, for example). The technique disclosed in the document is as follows. When an impact on a ball is detected by a trigger sensor, a mechanical shutter repeatedly opens and shuts while a flash unit fires repeatedly in synchronism with the movement of the shutter so as to capture multiple ball images in an image frame using a CCD camera.

Problems to be Solved

The device disclosed in Patent Document 1 requires a large scale system including a flash unit, a trigger sensor and the like as well as a CCD camera. Therefore, it is also conceivable to utilize a high-speed camera that can capture continuous frames as still images rapidly instead of a multiple exposure system so as to save a flash unit, and the like. However, an image sensor for a high-speed camera is a CMOS-type image sensor that can capture images in high-speed instead of a CCD-type image sensor. And the CMOS-type image sensor captures images using a rolling shutter system that exposes and accumulates electrical charges horizontal line by line. Consequently, the ball image in a frame becomes deformed when a high-speed moving ball is captured. Thus it is difficult to analyze the ball movement accurately using a deformed image of the moving ball in the frame.

SUMMARY OF THE INVENTION

According to a first aspect of the invention, provided is an imaging device (image pickup device) that includes an image pickup portion of a rolling shutter system, an image pickup controlling portion for controlling the image pickup portion so as to pickup at least two frame images by continuous image capturing, each of the images containing a ball image elliptically deformed, a separability calculating portion for calculating a separability of pixels between an inside region and an outside region by filtering the frame images captured by the image pickup controlling portion using an ellipse separability filter having the inside region of an ellipse shape whose major axis is inclined with respect to a horizontal line and the outside region that is adjacent to the inside region, an estimating portion for estimating a set of a center position, major axis, minor axis and inclination angle of the elliptical inside region, the set resulting in a maximum separability by changing the center position, major axis, minor axis and inclination angle of the inside region, as a set of a center position, major axis, minor axis and inclination angle of the ball image, and a state value calculating portion for calculating a moving-state value of the ball based on the each value of the center position, major axis, minor axis or inclination angle, estimated by the estimating portion, of the ball images in the at least two frame images.

According to a second aspect of the invention, provided is an imaging device that includes an image pickup portion of a rolling shutter system, an image pickup controlling portion for controlling the image pickup portion so as to pickup a frame image by an image capturing, the frame image containing a ball image elliptically deformed, a separability calculating portion for calculating a separability of pixels between an inside region and an outside region by filtering the frame image captured by the image pickup controlling portion using an ellipse separability filter having the inside region of an ellipse shape whose major axis is inclined with respect to a horizontal line and the outside region located adjacently and concentrically outside the inside region, an estimating portion for estimating a set of a center position, major axis, minor axis and inclination angle of the elliptical inside region, the set resulting in a maximum separability by changing the center position, major axis, minor axis and inclination angle of the inside region, as a set of a center position, major axis, minor axis and inclination angle of the ball image, a first intersection calculating portion for calculating positions of tangent points of an ellipse defined by the center position, major axis, minor axis and inclination angle estimated by the estimating portion with two parallel tangent lines that are in contact with the ellipse, a second intersection calculating portion for calculating an intersection point between the ellipse and a horizontal line that passes through the center position of the ellipse estimated by the estimating portion, and a speed calculating portion for calculating a speed of the ball based on the positions of the tangent points and the intersection points calculated by the first and the second intersection calculating portions, a delay time between horizontal lines of a rolling shutter of the image pickup portion and an actual size of the ball.

According to a third aspect of the invention, provided is a method for analyzing an imaging that includes a step of calculating a separability of pixels, for at least two frame images each image being continuously captured by an image pickup portion with a rolling shutter system and thus containing a moving ball image elliptically deformed, between an inside region and an outside region by filtering the frame images using an ellipse separability filter having the inside region of an ellipse shape whose major axis is inclined with respect to a horizontal line and the outside region that is adjacent to the inside region, a step of estimating a set of a center position, major axis, minor axis and inclination angle of the inside region, the set resulting in a maximum separability obtained in the separability calculating step by changing the center position, major axis, minor axis and inclination angle of the inside region, as a set of a center position, major axis, minor axis and inclination angle of the ball image, and a step of calculating a moving-state value of the ball based on the each value of the center position, major axis, minor axis and inclination angle, estimated in the estimating step, of the ball image in the at least two frame images.

According to a fourth aspect of the invention, provided is a method for analyzing an imaging that includes a step of calculating a separability of pixels, for a frame image being captured by an image pickup portion with a rolling shutter system and thus containing a moving ball image elliptically deformed, between an inside region and an outside region by filtering the frame image using an ellipse separability filter having the inside region of an ellipse shape whose major axis is inclined with respect to a horizontal line and the outside region located adjacently and concentrically outside the inside region, a step of estimating a set of a center position, major axis, minor axis and inclination angle, the set resulting in a maximum separability obtained in the separability calculating step by changing the center position, major axis, minor axis and inclination angle, as a set of a center position, major axis, minor axis and inclination angle of the ball image, a step of calculating tangent points (first intersection points) of an ellipse defined by the center position, major axis, minor axis and inclination angle estimated by the estimating step with two parallel tangent lines that are in contact with the ellipse, a step of calculating intersection points (second intersection points) between the ellipse and a horizontal line that passes through the center position of the ellipse estimated by the estimating step, and a step of calculating a speed of the ball based on the position of the tangent point and the intersection point calculated by the calculating steps for the tangent point and the intersection point, a delay time between horizontal lines of a rolling shutter of the image pickup portion and an actual size of the ball.

BRIEF DESCRIPTION OF THE DRAWINGS

FIG. 10 shows images of a ball in frames.

DETAILED DESCRIPTION OF PREFERRED EMBODIMENTS

Exemplary embodiments of the present invention will be explained with reference to the drawings. Although a number of preferable technical limitations are included in the embodiments explained below, the present invention is not limited to the embodiments and the drawings.

First Exemplary Embodiment

Figure 1:
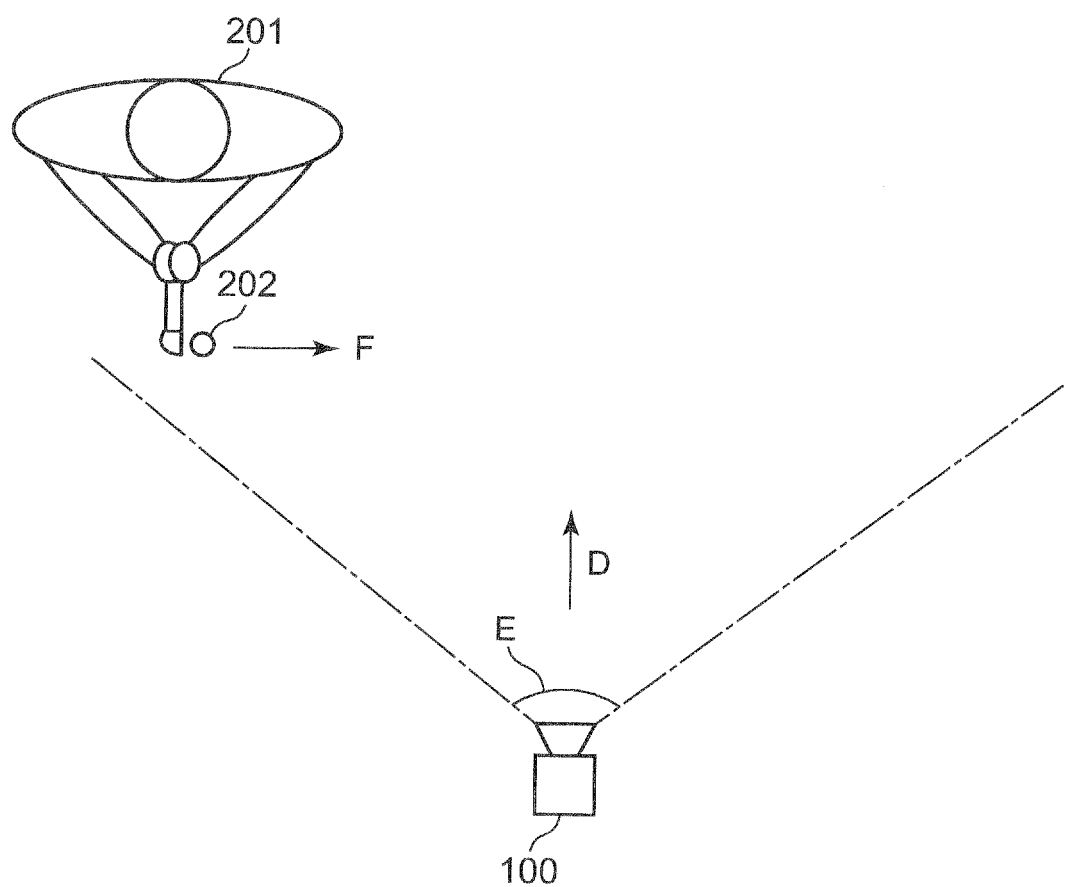
FIG. 1 is a plan view indicating a usage state of an imaging device according to a first exemplary embodiment of the present invention.

FIG. 1 is a plan view illustrating a usage state of an imaging device 100 according to an exemplary embodiment of the present invention. As shown in FIG. 1, the imaging device 100 is arranged such that an image pickup direction D is almost horizontal and a hitter 201 hits a round ball 202 to a direction F that is orthogonal to the image pickup direction D within an image pickup area E of the imaging device 100. It is arranged such that the ball 202 at the time of hitting is within the image pickup area E of the imaging device 100. The imaging device 100 captures continuous images such that the ball 202 is contained in each frame from the rest state before hitting to the moving state in high speed after hitting. The imaging device 100 analyzes a speed, hitting direction, rotating state, etc. of the ball 202 based on the frame images (also referred to as "frame" or "frames" simply hereinafter) in which the images of the ball 202 are captured continuously.

Figure 2:
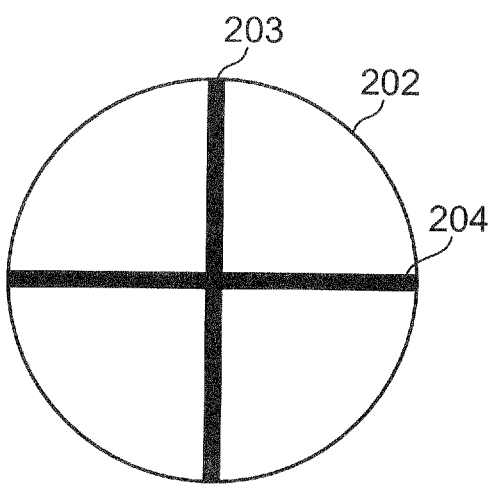
FIG. 2 is a ball used for an embodiment.

Preferably a color of the ball 202 is white and the background is dark so as to pickup the images of the ball 202 clearly. It is also preferable to attach a mark and/or a pattern on a surface of the ball 202 so that the rotating state of the ball 202 can be analyzed easily. As shown in FIG. 2, for example, circumferential lines 203 and 204 intersecting at right angles are attached on a surface of the ball 202.

Figure 3:
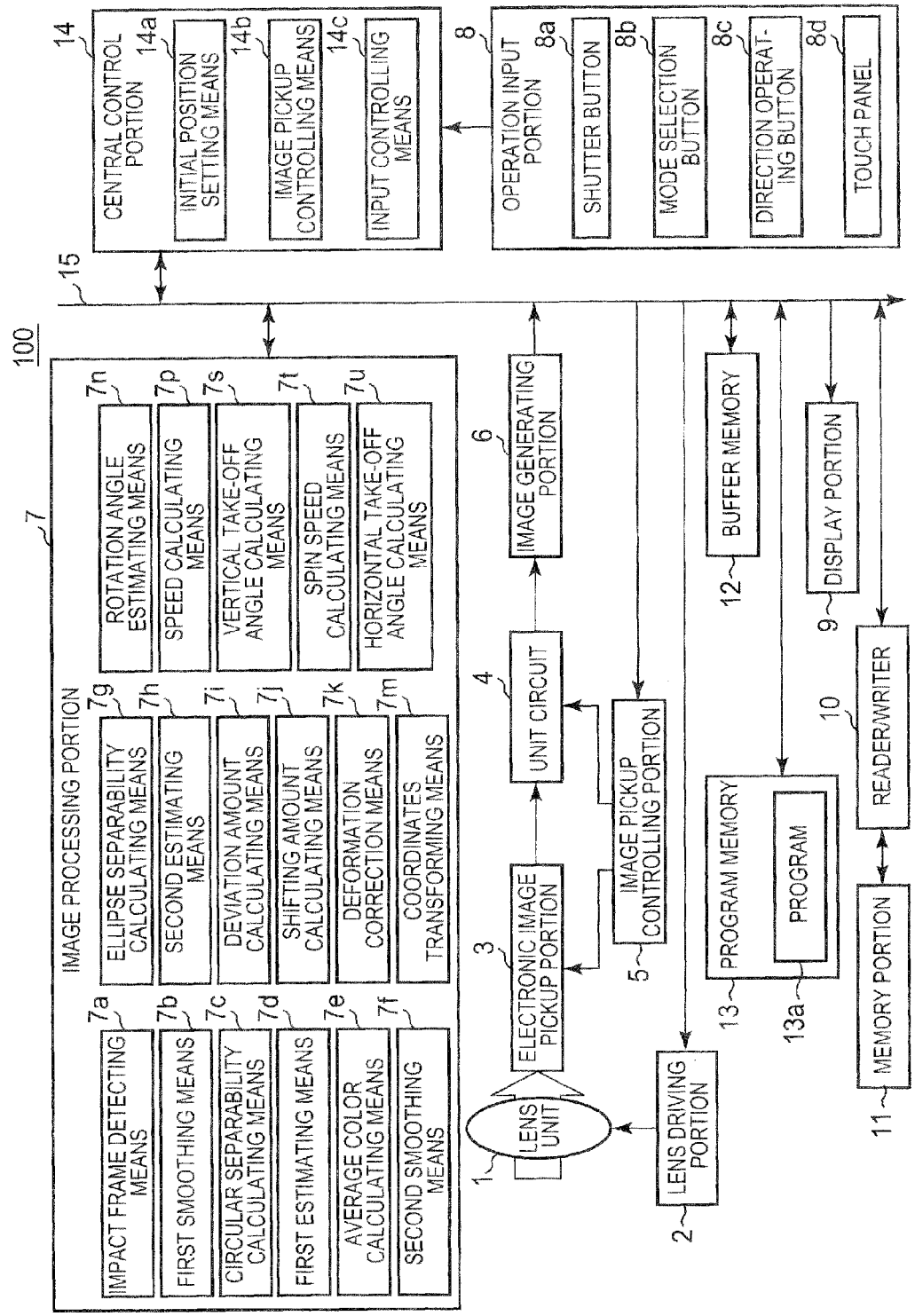
FIG. 3 is a structural block diagram of an imaging device.

FIG. 3 is a structural block diagram of the imaging device 100. The imaging device 100 is a ball movement analyzing device and preferably a digital camera. The imaging device 100 includes a lens unit 1, lens driving portion 2, electronic image pickup portion 3, unit circuit 4, image pickup controlling portion 5, image generating portion 6, image processing portion 7, operation input portion 8, display portion 9, reader/writer 10, buffer memory 12, program memory 13, central control portion 14, and the like. A memory portion 11 as an external memory medium is mounted on the imaging device 100.

The lens driving portion 2, image pickup controlling portion 5, image generating portion 6, image processing portion 7, display portion 9, reader/writer 10, buffer memory 12, program memory 13 and central control portion 14 are connected each other via a bus line 15. A computer of the imaging device 100 is composed of the image processing portion 7, buffer memory 12, central control portion 14 and bus line 15.

Upon an operation by a user, the operation input portion 8 outputs corresponding operational signals to the central control portion 14. The operation input portion 8 includes, for example, operation buttons such as a shutter button 8a, mode selection button 8b and direction operation button 8c and a touch panel 8d provided on a display surface of the display portion 9. The shutter button 8a is used for instructing an image pickup by the electronic image pickup portion 3. The mode selection button 8b is used for selecting an imaging mode among a normal imaging mode, continuous imaging mode, ball movement analyzing mode, and the like. The direction operation button 8c is used for moving a cursor on the display surface of the display portion 9. The touch panel 8d is used for inputting various instructions by touching various positions.

The lens unit 1 is composed of a plurality of lenses and has a focusing function and a zoom function. The lens unit 1 forms an image of a subject to be imaged (mainly the ball 202) in front of the lens unit 1 and its background on the electronic image pickup portion 3.

The lens driving portion 2 moves each lens of the lens unit 1 along the optical axis thereof. Specifically, the lens driving portion 2 is provided with a driving source, such as a focusing motor, to move the lenses along the optical axis and a driver to activate the driving source (both not shown).

The electronic image pickup portion 3 is arranged behind the lens unit 1 on the optical axis of the lens unit 1. The portion 3 is constituted from an image sensor such as a CMOS (Complementary Metal-Oxide Semiconductor), for example. The portion 3 converts an optical image formed by the lens unit 1 into two-dimension image signals. The portion 3 can capture continuous frame images rapidly. That is, the portion 3 captures frame images continuously containing the subject such as the ball 202 on movement and outputs the plurality of image frames to the unit circuit 4 in turn. A rate of continuous image frame capturing by the portion 3 is designated as $F_{rate}$ (fps). The portion 3 performs image pickup by a rolling shutter system. In other words, the image sensor of the portion 3 exposes and accumulates electric charges for each horizontal line. The number of vertical lines of the portion 3 is designated as Sx and the number of horizontal lines is designated as Sy. When a rapid-moving subject to be picked up is captured by the portion 3, the image of the subject in a frame is deformed. Such a deformation is known as a rolling shutter deformation.

Analogue image signals corresponding to the optical image of the subject output from the portion 3 is input to the unit circuit 4. The unit circuit 4 is composed of a CDS for storing the analog image signals, a gain adjustable amplifier (AGC) for amplifying the image signals, an A/D converter (ADC) for converting the image signals amplified by the gain adjustable amplifier into digital image data, and so on (all not shown). The unit circuit 4 outputs the digital image data to the image generating portion 6.

The image pickup controlling portion 5 controls the electronic image pickup portion 3 and the unit circuit 4 so as to activate the portion and the circuit at the timing in accordance with the frame rate set by the central control portion 14.

Specifically, the portion 5 includes a TG (Timing Generator), a driver to activate the electronic image pickup portion 3 (both not shown), and so on and controls the operation timing of the driver and the unit circuit 4 through the TG. That is, after setting the shutter speed by the central control portion 14 in accordance with a program 13a read from the program memory 13, the TG of the portion 5 outputs an electric charge accumulation time corresponding to the shutter speed as a shutter pulse to the driver and activates the electronic image pickup portion 3 of the rolling shutter system in accordance with activating pulse signals from the driver so as to control the electric charge accumulation time (exposure time). An image for one frame is captured by the electronic image pickup portion 3 in this way. For capturing continuous frames, after setting a frame rate by the central control portion 14, the portion 5 activates the electronic image pickup portion 3 of the rolling shutter system repeatedly in accordance with the frame rate so as to have the portion 3 capture images continuously.

The lens unit 1, electronic image pickup portion 3, unit circuit 4 and the image pickup controlling portion 5 structured as above explained forms an image pickup means to pickup a subject image.

The image generating portion 6 performs various processing to the image output from the unit circuit 4 such as a gamma correction processing, white balance processing, and the like. The portion 6 outputs the processed image to the reader/writer 10 under the control of the central control portion 14. The reader/writer 10 stores the processed images in the memory portion 11. The memory portion 11 is a nonvolatile semiconductor memory or a hard disc and stores the images.

When the shutter button 8a is pressed down, an image which is processed by the image generating portion 6 is recorded in the memory portion 11 by the reader/writer 10. Before the shutter button 8a is pressed down an image processed by the portion 6 is temporarily stored in the buffer memory 12 and the display portion 9 converts the temporarily-stored image in the buffer memory 12 into video signals and display the image on the display surface as a live view image.

The reader/writer 10 reads the image stored in the memory portion 11. The image read out by the reader/writer 10 is stored temporarily in the buffer memory 12. The image temporarily stored in the buffer memory 12 can be converted into video signals by the display portion 9 and/or processed by the image processing portion 7.

The buffer memory 12 is a buffer for storing images temporarily and can be used as a working memory for the central control portion 14.

The program memory 13 stores the program 13a and various data for functioning the imaging device 100. The program 13a is a program readable by the central control portion 14 and the image processing portion 7.

The central control portion 14 has a CPU (not shown) for controlling each portion of the imaging device 100. The program 13a makes the central control portion 14 function as an initial position setting means 14a, image pickup controlling means 14b, input controlling means 14c, and the like and the central control portion 14 controls each portion of the imaging device 100 in accordance with the program 13a. The functions of the central control portion 14 will be explained later.

The image processing portion 7 has a processor (not shown) for image processing such as an operation about coordinates of each pixel of an image, an operation about a pixel value for each pixel, and the like. The portion 7 processes images according to the program 13a. That is, the program 13a makes the portion 7 function as a hitting-time (impact) frame detecting means 7a, first smoothing means 7b, circular separability calculating means 7c, first estimating means 7d, average color calculating means 7e, second smoothing means 7f, ellipse separability calculating means 7g, second estimating means 7h, deviation amount calculating means 7i, shifting amount calculating means 7j, deformation correction means 7k, coordinates transforming means 7m, rotation angle estimating means 7n, speed calculating means 7p, vertical take-off (ejection) angle calculating means 7s and spin speed calculating means 7t, horizontal take-off (ejection) angle calculating means 7u. The functions of the portion 7 will be explained later.

Next, the process flow that the central control portion 14 and the image processing portion 7 performs according to the program 13a will be explained with reference to the flowchart in FIG. 4. Before performing following processing by the central control portion 14 and the image processing portion 7, the imaging device 100 have to be set as indicated in FIG. 1.

At first, the central control portion 14 functions as an initial position determining means 14a by the program 13a and sets an initial position ($X_{ini}$, $Y_{ini}$) of the ball in a two dimensional rectangular coordinates system in which positions of the image pixels are expressed (step S1). Specifically, by operating the direction operating button 8c, a user moves the cursor onto the ball image in a live view image (the live view image is picked up by the electronic image pickup portion 3 and displayed on the display portion 9). Then the portion 14 determines the position of the cursor as the initial position ($X_{ini}$, $Y_{ini}$). It may be applicable that a user can touch the ball position on the touch panel 8d of the live view image so that the portion 14 determines the touched position as the initial position ($X_{ini}$, $Y_{ini}$). Or after setting an initial position ($X_{ini}$, $Y_{ini}$) by the portion 14, a user can move the imaging device 100 such that a rectangle, the center of which will become an initial position ($X_{ini}$, $Y_{ini}$) of the ball, displayed in the live view image comes to the position of the ball. An appropriate gain by which a user can confirm the live view image easily is set in the unit circuit 4 at the initial position ($X_{ini}$, $Y_{ini}$) determining step. It may be also applicable that, when the first frame image or a later frame image is displayed on the display portion 9 after multiple frame images are captured continuously, a user can operate the direction operation button 8c to set the cursor on the ball position or touch the ball position on the touch panel 8d so that the image processing portion 7 can determine the initial position ($X_{ini}$, $Y_{ini}$) based on the cursor position or touch position, as will be explained later. A horizontal line of the pixel matrix (a horizontal pixel line) of the electronic image pickup portion 3 is the x-direction of the two dimensional rectangular coordinates system and the vertical line (a vertical pixel line) is the y-direction of the two dimensional rectangular coordinates system.

Next, the central control portion 14 plays a role as the image pickup controlling means 14b by the program 13a and picks up images continuously (step S2). Specifically, upon pressing the shutter button 8a by a user, the portion 14 sets the activation timing and the frame rate ($F_{rate}$) of the unit circuit 4 and the electronic image pickup portion 3. The image pickup controlling portion 5 activates the portion 3 repeatedly in accordance with the activation timing and the frame rate by the rolling shutter system so as to pickup continuous image frames rapidly. It is preferable that a shutter speed of the portion 3 is as fast as possible and the frame rate $f_{rate}$ is as high as possible.

The hitter 201 hits the ball 202 during the continuous image capturing. As a result a plurality of frame images containing the ball image from the point of time the ball 202 is still to the time the ball is moving are continuously captured by the portion 3. The images captured by the portion 3 are output to the reader/writer 10 in turn through the unit circuit 4 and the image generating portion 6 and the reader/writer 10 stores the images in the memory portion 11 in turn. The image processing portion 7 stores image pickup conditions (horizontal angle of view $A_H$ and vertical angle of view $A_V$ of the lens unit, frame rate ($F_{rate}$), etc.) during the continuous shooting in the memory portion 11 as well. A gain of an analog stage (gain adjustment amplifier) before an A/D inverter of the unit circuit 4 is preferably set as high as possible when signals of the continuous images captured by the electronic image pickup portion 3 are processed by the unit circuit 4.

Figure 5:
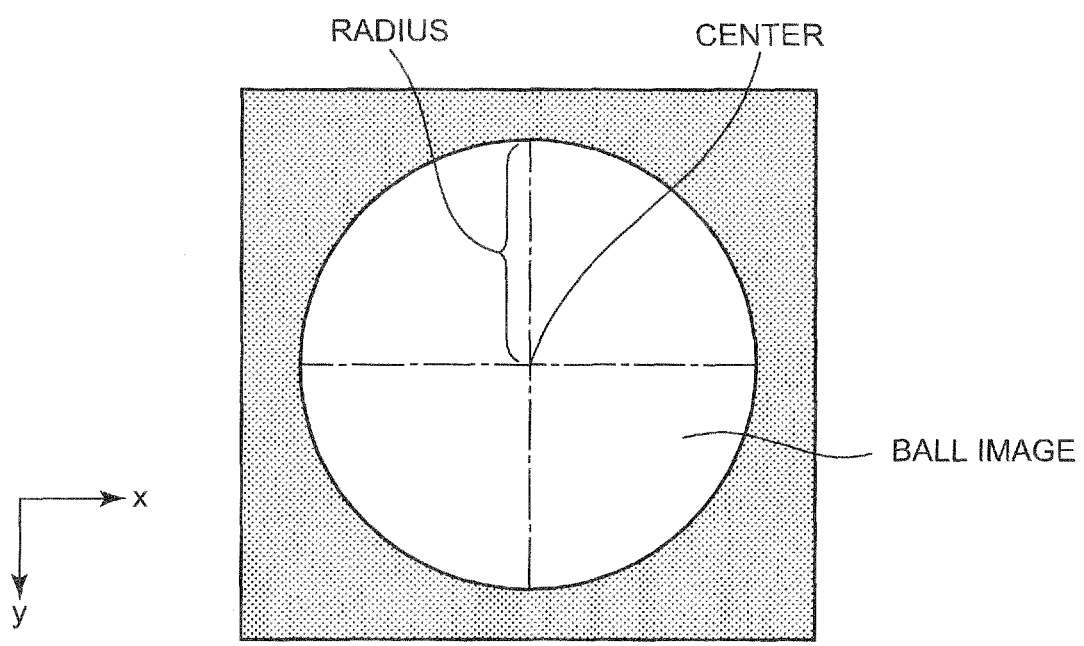
FIG. 5 is an example of a captured image of a still ball.
Figure 6:
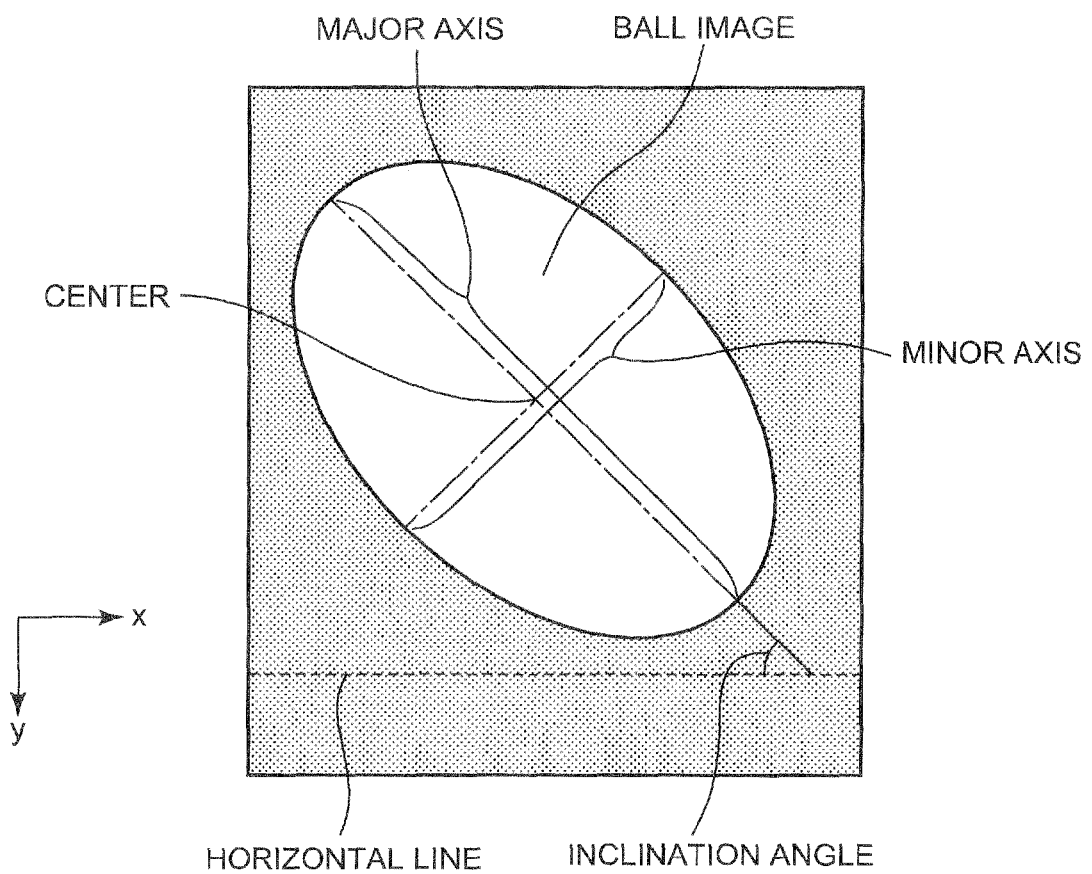
FIG. 6 is an example of a captured image of a moving ball.

FIG. 5 is an image of the ball in a frame before hitting (impact) of the ball 202 and FIG. 6 is an image of the ball in a frame after hitting (impact) of the ball 202. As shown in FIG. 5, when the ball 202 is still, the ball image is circular (not deformed) and when the ball 202 is moving, the ball image is deformed into an ellipse. FIG. 6 is an image under assumptions that the ball 202 moves from left to right in front of the imaging device 100 and the image sensor of the portion 3 exposes and accumulates charges horizontally from up to down.

Instead of setting the initial position ($X_{ini}$, $Y_{ini}$) before continuous image capturing, a user can operate the direction operating button 8c so as to set the cursor on the ball position or touch the ball position on the touch panel 8d so that the central control portion 14 can determine the initial position ($X_{ini}$, $Y_{ini}$) based on the cursor position or touch position when the first frame or a later frame is displayed on the display portion 9 after continuous image capturing.

Next, the central control portion 14 functions as the input controlling means 14c by the program 13a and stores the data input through the operation input portion 8 to the buffer memory 12, and the like. Specifically, a user operates the operation input portion 8 so that the user inputs various image pickup conditions such as a size of the ball 202 and an imaging distance (a distance between a subject plane that is orthogonal to the image pickup direction D and passes through the ball 202 before impact and the imaging device 100 (lens unit 1 and the portion 3, etc.)), for example, and the central control portion 14 stores the input conditions in the buffer memory 12.

Next, the image processing portion 7 functions as the impact frame detecting means 7a by the program 13a and detects the frame at the point of time the ball 202 is hit (impact frame) among the continuous frames stored in the memory portion 11 (step S3). The process in the step S3 to detect the impact frame which the ball 202 is hit will be explained with reference to the flowchart in FIG. 7.

Figure 7:
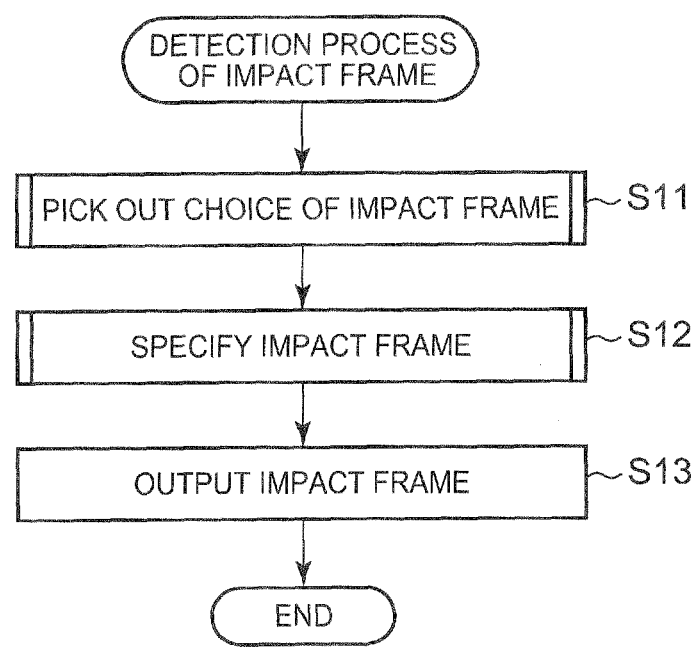
FIG. 7 is a flowchart of a sub-routine process performed by a computer of an imaging device.

As shown in FIG. 7, the image processing portion 7 picks out a choice of the impact frame (step S11), specifies the impact frame among the frames around the choice frame (step S12) and outputs the impact frame to the display portion 9 so as to display the frame on the display portion 9 (step S13).

Figure 8:
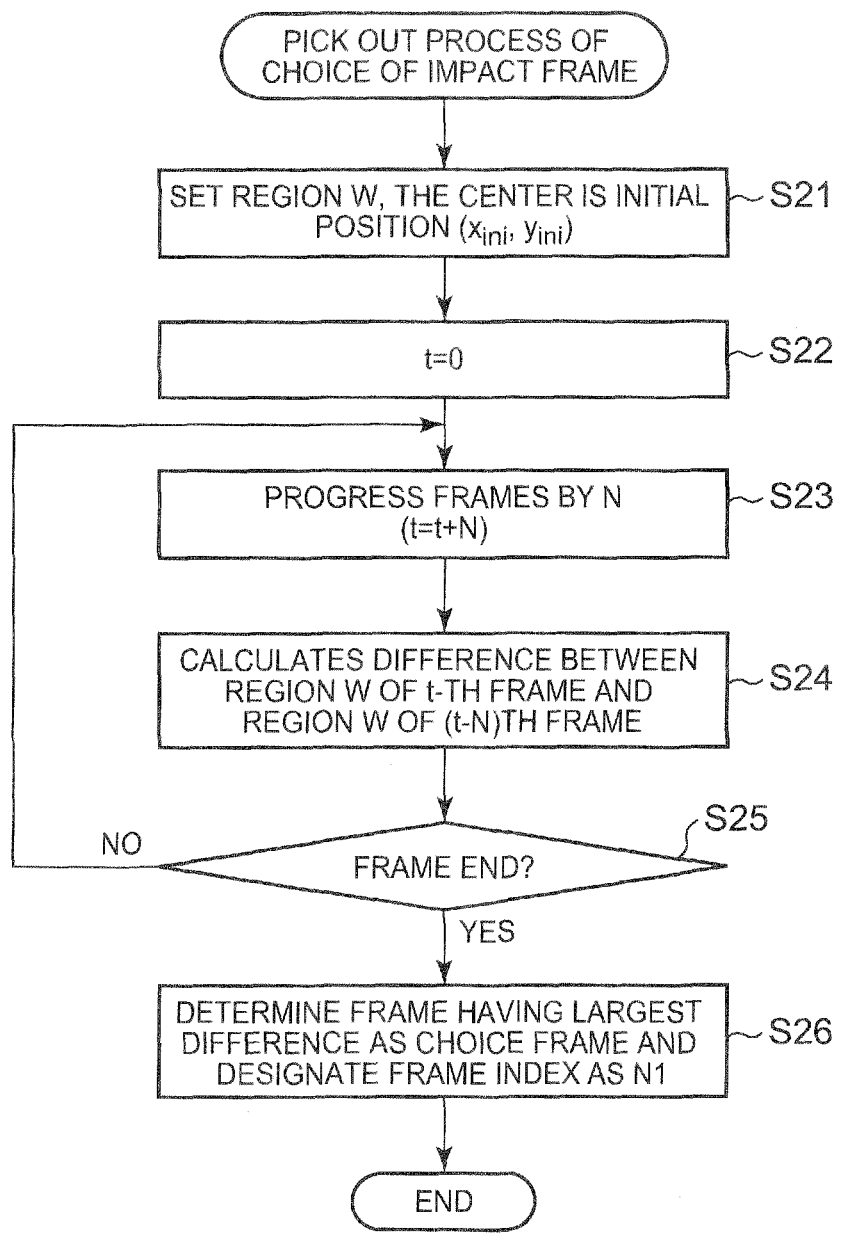
FIG. 8 is a flowchart of a sub-sub-routine process performed by a computer of an imaging device.
Figure 9:
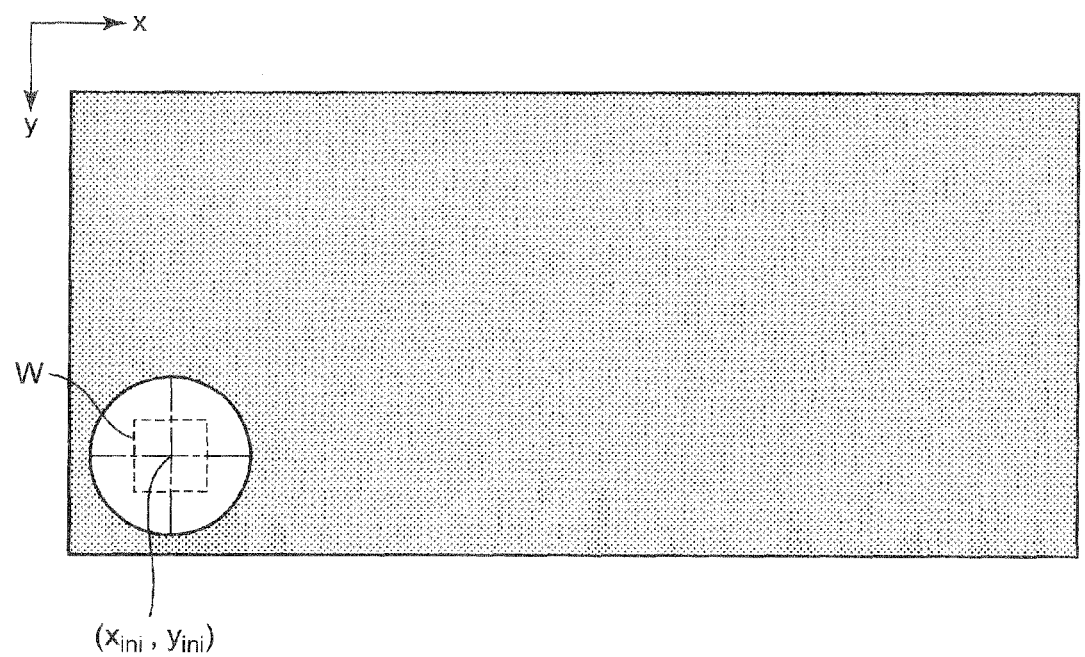
FIG. 9 is an image in a frame before impact.

FIG. 8 is a flowchart for explaining the step to pick up a choice of the impact frame (step S11) in detail. At first, the image processing portion 7 sets a rectangular region W (see FIG. 9) the center of which is the initial position ($X_{ini}$, $Y_{ini}$) set by the central control portion 14 (step S21). FIG. 9 explains the region W and the whole frame containing the ball image before impact is shown with the region W in FIG. 9. Preferably, the size of the region W (a size in the x direction is designated as wx and in the y direction is designated as wy, respectively) is within the size of the ball image. A shape of the region W is not necessarily a rectangle.

Next, the image processing portion 7 reads out a t-th frame from the top and a frame that is N frames prior to the t-th frame among the continuous frames stored in the memory portion 11. The number N is an integer of 2 or more and preferably large enough based on a time that the ball passes through the region W and the frame rate. After that the portion 7 calculates a difference between the region W of the t-th frame and the region W of the (t−N)th frame (step S22, S23 and S24). Specifically, as shown in the following formula 1, the portion 7 calculates a sum of absolute differences of pixel values of the same pixels between the t-th frame and the previous frame in the region W.

$$difW1(t) = \sum_{x,y \in W} |(f_{t-N}(x, y) - f_t(x, y)|$$ (Formula 1)

In the formula, t is a frame index, ft(x, y) is a pixel value of each pixel in the t-th frame, $f_{t-N}$(x, y) is a pixel value of each pixel in the (t−N)th frame and difW1(t) is a difference in the region W between the t-th frame and the previous frame.

The image processing portion 7 calculates the difference difW1(t) of the region W between two frames every Nth frame (step S25: NO). When the calculation process for the difference difW1(t) above explained reached to the last frame after repeating the process every Nth frame (step S25: YES), the portion 7 determines a frame having the largest difference difW1(t) as a choice of an impact frame (step S26). A frame index of the choice frame is designated as N1 hereinafter. Since calculations of the differences difW1(t) are executed every Nth frame, the burden of the calculation process can be reduced.

Figure 11:
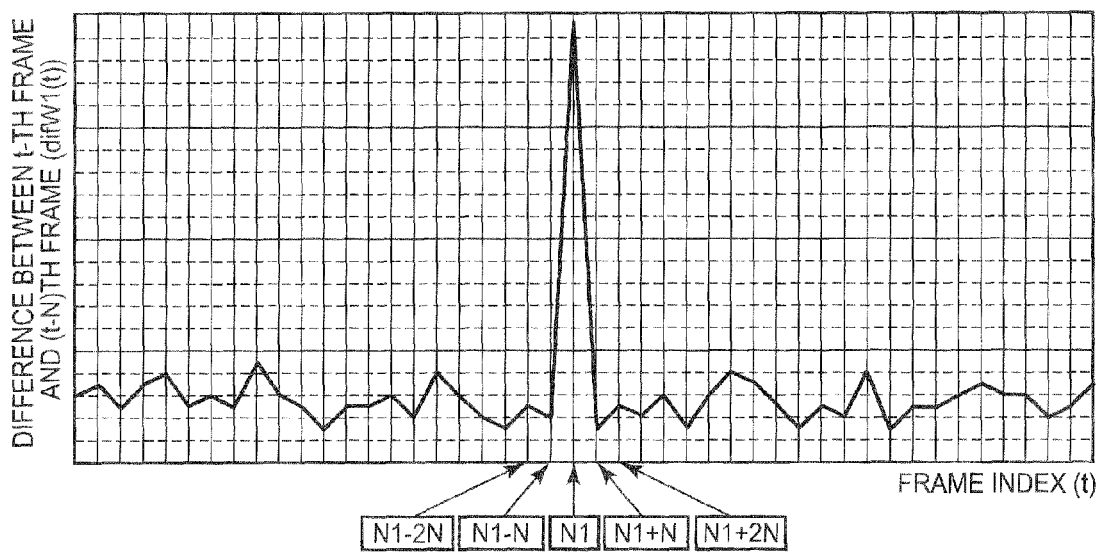
FIG. 11 is a graph showing a relation between a frame index and a difference.

FIG. 10 shows the situations of the ball in the Nth frame, (N1−N)th frame and (N1−2N)th frame. FIG. 11 is a graph showing calculated difference for each frame every Nth frame. The horizontal axis of FIG. 11 is a frame index and the vertical axis is a difference difW1(t). As shown in FIG. 10, the ball is still in the (N1−N)th frame that is before the frame N1 in which the ball 202 is impacted. In the frame N1, the ball image is out of the region W and an image of a hitting body (the head of a golf club, for example) is passing through the region W. As a result, as shown in FIG. 11, the N1th frame has the largest difference difW1(t) between the regions W of two frames every Nth frame. Thus the frame having the largest difference difW1(t) is determined as a choice of the impact frame. However, it is not possible to determine a frame at a point of time that the ball starts to move among the (N1−N)th frame to the N1th frame. The portion 7 executes steps shown in FIG. 12 to determine the frame.

Figure 12:
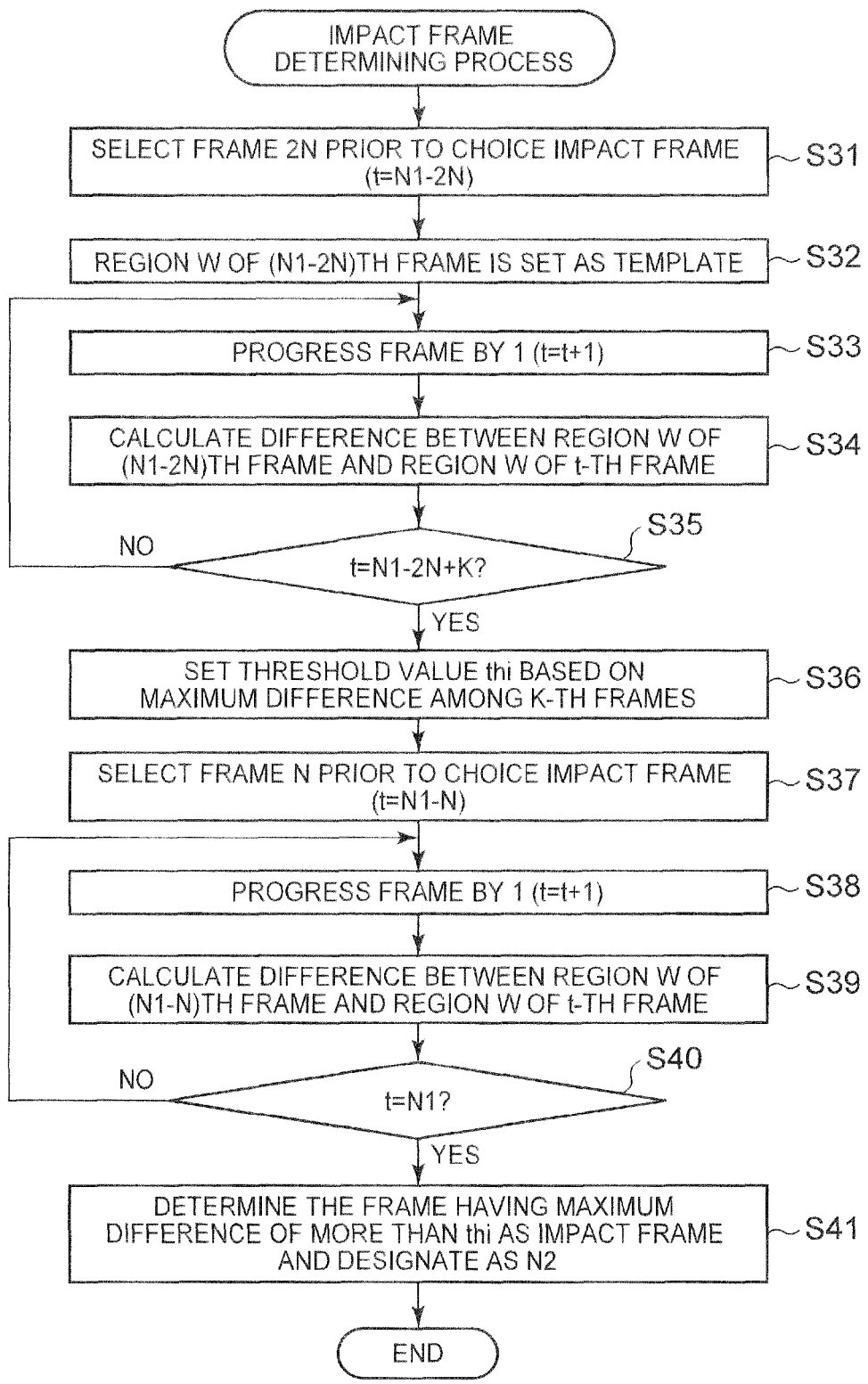
FIG. 12 is a flowchart of a sub-sub-routine process performed by a computer of an imaging device.

FIG. 12 is a flowchart explaining a process (step S12) to determine the impact frame.

At first the image processing portion 7 reads out a (N1−2N)th frame that is 2N frames prior to the N1th frame determined at the step S26 in FIG. 8 (step S31). A region W of the frame is set as a template (step S32).

The image processing portion 7 reads out a next frame from the memory portion 11 (step S33) and calculates a difference between a region W of the (N1−2N)th frame as the template and a region W of the next frame (step S34). Specifically, as shown in the next formula, the portion 7 calculates a sum of the absolute differences of pixel values of the same pixels between the (N1−2N)th frame and the next frame.

$$difW2(t) = \sum_{x,y \in W} |f_{tmp}(x, y) - f_t(x, y)|$$ (Formula 2)

Figure 13:
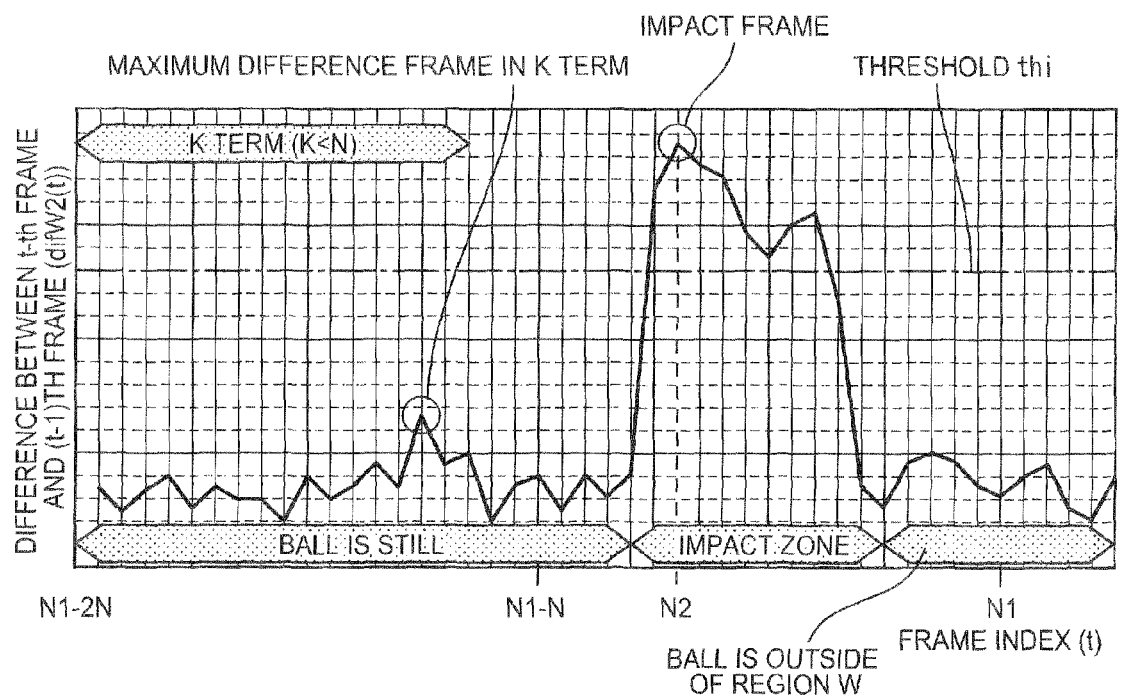
FIG. 13 is a graph showing a relation between a frame index and a difference.

The $f_{tmp}$(x,y) is a pixel value of each pixel in the (N1−2N)th frame as the template and the difW2(t) is a difference between the region W in the (N1−2N)th frame as the template and the region W in the t-th frame. FIG. 13 is a graph showing calculated difference for each frame every other frame. The horizontal axis of FIG. 13 is a frame index and the vertical axis is a difference difW2(t).

The portion 7 calculates the difference difW2(t) in every other frame. The portion 7 performs the calculations of the difference difW2(t) K-times (K is larger than zero and smaller than N) repeatedly (step S35: NO). The portion 7 calculates differences difW2(t) from the (N1−2N)th frame, which the ball is still, to the (N1−2N+K)th frame and determines a threshold value "thi" based on the maximum difference value difW2(t) (step S36). For example, the threshold value thi may be a twice of the maximum difference value difW2(t).

The image processing portion 7 then calculates differences difW2(t) from a (N1−N)th frame to the N1th frame every other frame using the ftmp(x,y) as a template (step S37, step S38, step S39 and step S40: NO). After reaching to the N1th frame (step S40: YES), the portion 7 determines the frame having the difference difW2(t) that is largest and larger than the threshold value thi as the impact frame (step S41). The reason why the threshold thi is applied is to exclude possible large difference difW2(t) caused by a noise in a frame before impact or after impact having no ball image in the region W. A frame index of the impact frame is designated as N2 hereinafter. It is possible to determine the first frame having the difference difW2(t) larger than the threshold thi as the impact frame.

The frame in which the ball 202 is hit (impact frame) is detected by the image processing performed by the image processing portion 7 as explained above. Therefore, a trigger sensor to detect the hitting of the ball 202 becomes unnecessary and thus the structure of the imaging device 100 becomes simple. In addition, even when the continuous image frames become apt to include noise by setting high ISO sensitivity (gain) of the unit circuit 4, it is hard to be influenced by the noise because the impact frame is detected by using the differences difW1(t) and difW2(t).

Figure 4:
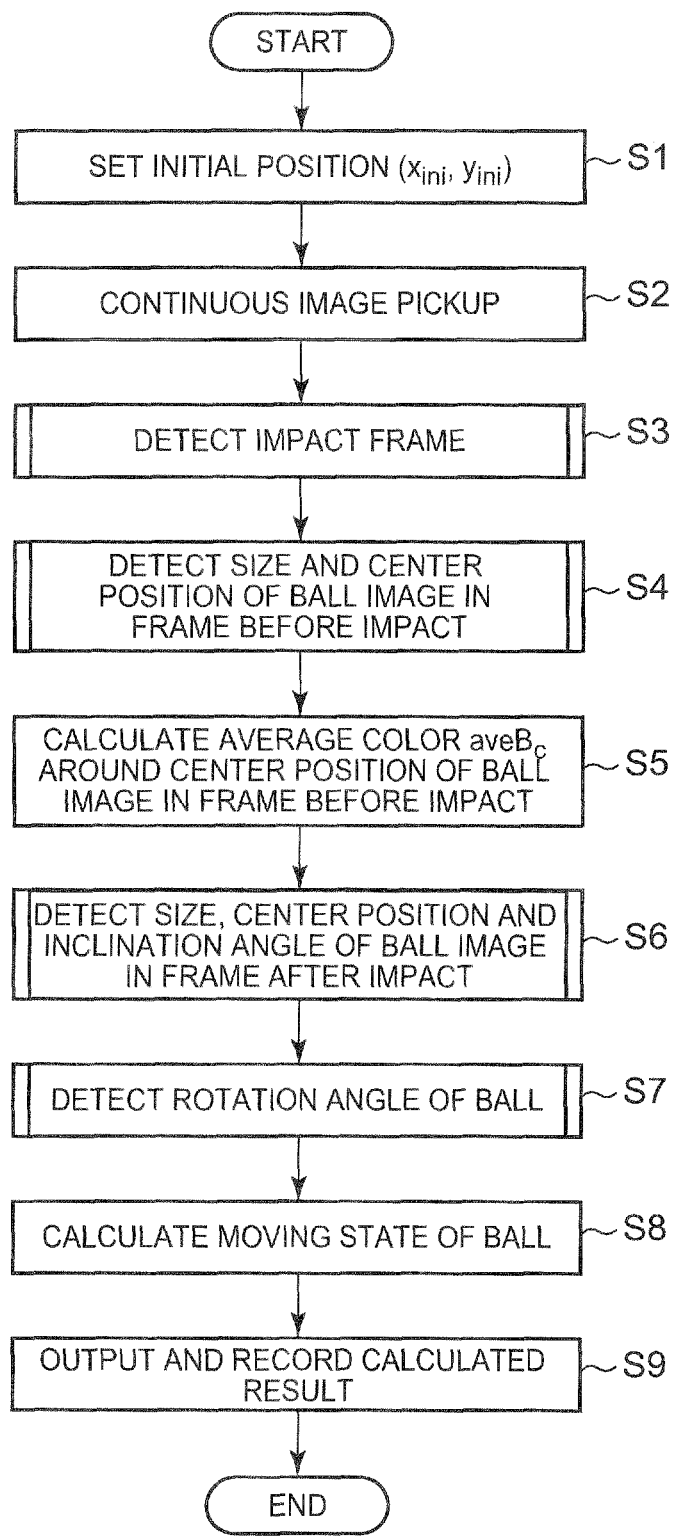
FIG. 4 is a flowchart of a main routine process performed by a computer of an imaging device.

After detecting the impact frame of the ball 202 (step S3), as shown in FIG. 4, the image processing portion 7 detects a size and center position of the image of the ball 202 before impact (step S4).

Figure 14:
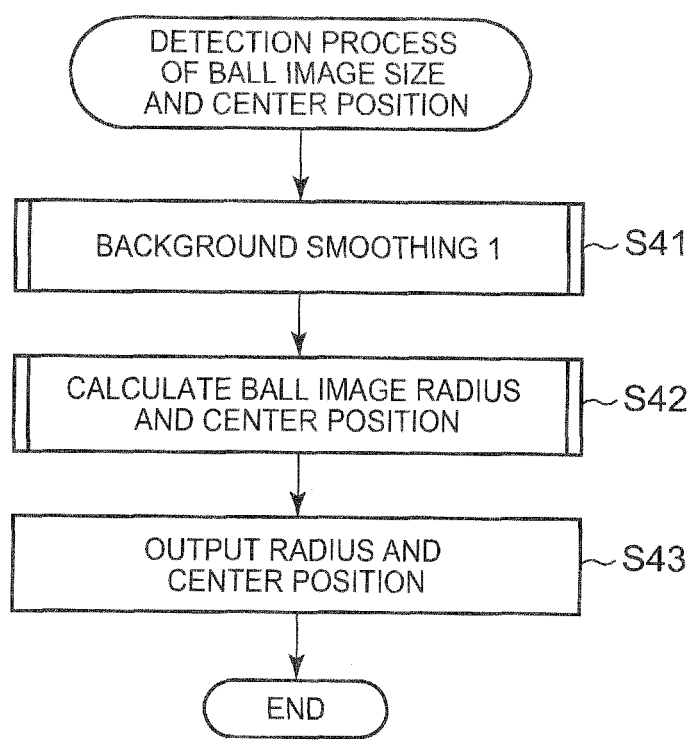
FIG. 14 is a flowchart of a sub-routine process performed by a computer of an imaging device.

FIG. 14 is a flowchart indicating a process (step S4) to detect the size and center position of the image of the ball 202 before impact. As shown by FIG. 14, the portion 7 smoothes (removes) the background in the frame before impact of the ball 202 (step S41), calculates the center position and radius of the ball image in the frame the background is smoothed (step S42) and outputs the calculated center position and the radius (step S43).

Figure 15:
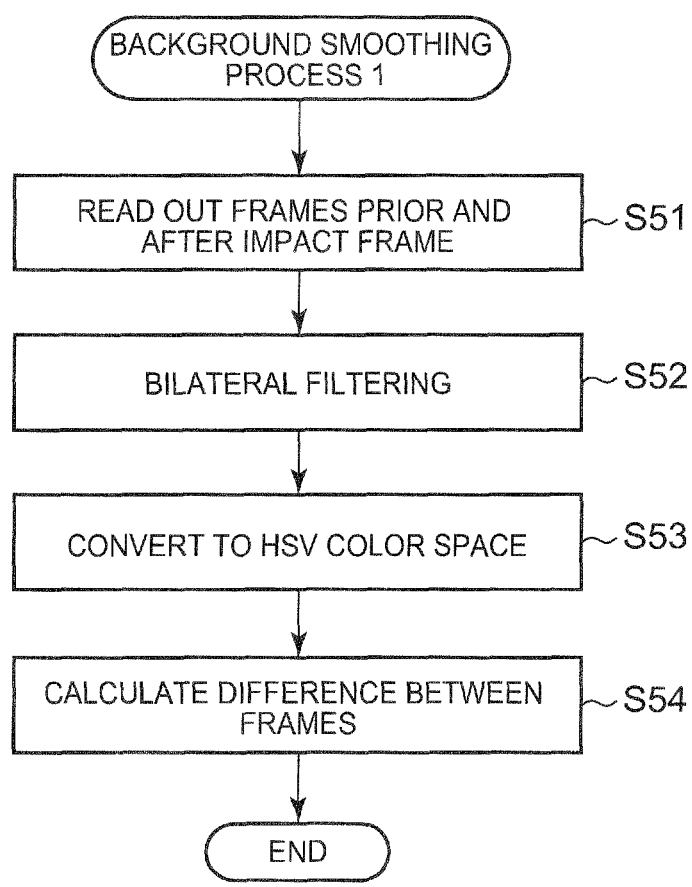
FIG. 15 is a flowchart of a sub-sub-routine process performed by a computer of an imaging device.

FIG. 15 is a flowchart explaining the smoothing process 1 of the background (step S41). The smoothing process 1 (step S41) is performed by the portion 7 that functions as the first smoothing means 7b by the program 13a.

As shown in FIG. 15, the image processing portion 7 reads out a frame several frames prior to the N2th impact frame (called as a "pre-impact frame" hereinafter) and a frame several frames after the N2th impact frame (called as a "post-impact frame" hereinafter) from the memory portion 11 (step S51). The number of frames from the pre-impact frame to the impact frame and the number of frames from the impact frame to the post-impact frame are determined based on the frame rate $F_{rate}$ and the angle of view of the lens unit 1 at the time of continuous image pickup. Specifically, the pre-impact frame is a frame just before the hitting body to hit the ball 202 comes into the image pickup area E and the post-impact frame preferably is a frame the ball is out of the image pickup area E. In other words, the pre-impact frame does not contain an image of the hitting body and the post-impact frame does not contain an image of the ball.

Next, the image processing portion 7 filters the pre-impact frame by a bilateral filter (step S52). A bilateral filter is a filter to blur an image with keeping an edge in the image. Therefore, noise of the ball image and the background is removed while an edge of the ball is maintained in the filtered frame. The portion also filters the post-impact frame by the bilateral filter (step S52).

Next, if the color space of the filtered pre-impact frame and the post-impact frame be not HSV color space such as RGB color space, the portion 7 converts the color space of the pre-impact frame and the post-impact frame into the HSV color space (step S53). However, the transformation process of the color space may be omitted.

Next, the image processing portion 7 calculates the absolute difference between the pre-impact frame and the post-impact frame (step S54). That is, the portion 7 calculates the absolute differences of the pixel values of the same pixels between the pre-impact frame and the post-impact frame. By the process the background around the ball image in the pre-impact frame is smoothed by the background of the post-impact frame while the ball image in the pre-impact frame is maintained.

Figure 16:
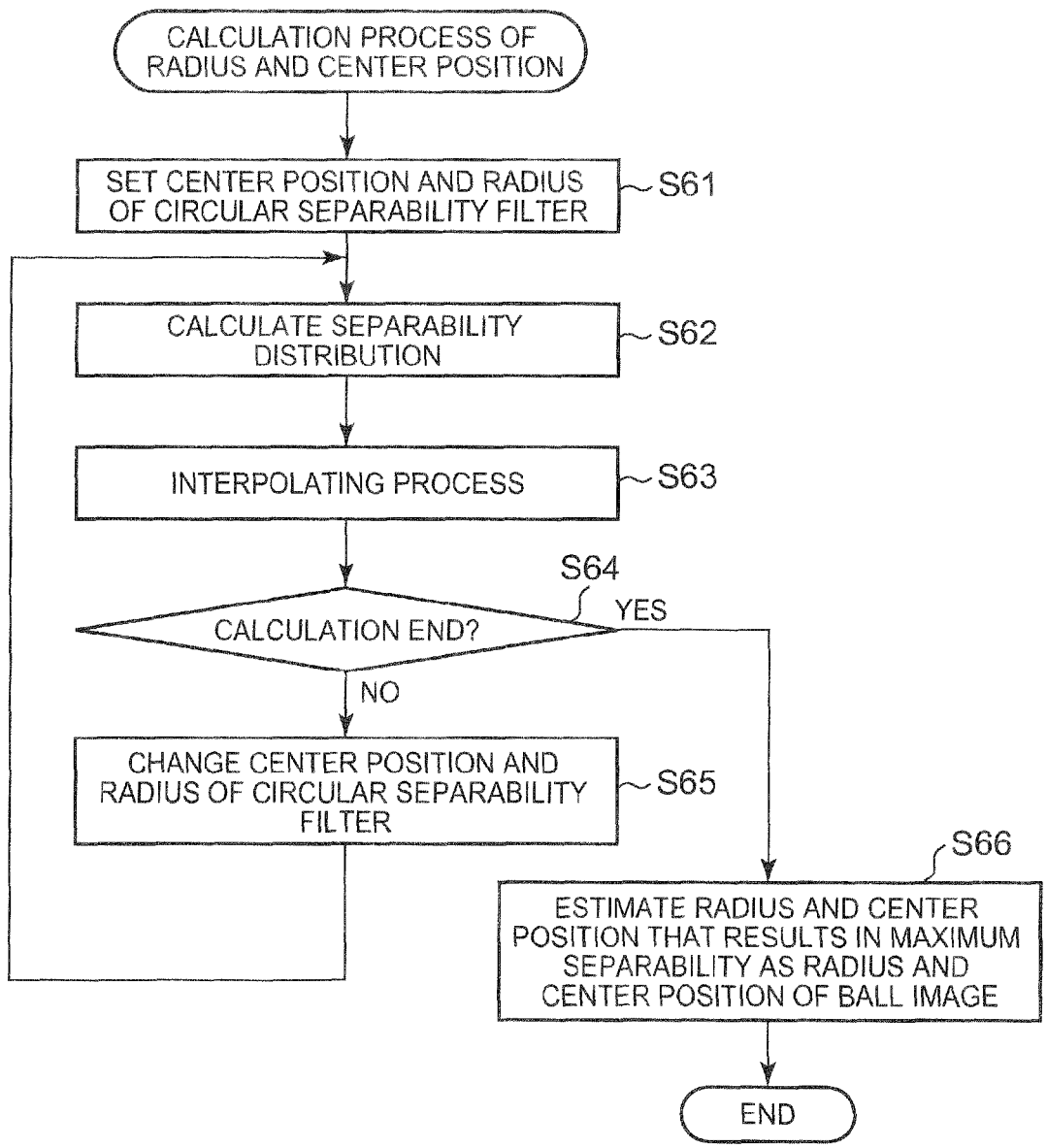
FIG. 16 is a flowchart of a sub-sub-routine process performed by a computer of an imaging device.

FIG. 16 is a flowchart explaining the process to calculate the center position and the radius of the ball image (step S42). In this process shown in FIG. 16 the portion 7 functions as a circular separability calculating means 7c by the program 13a and calculates separability of each pixel by using a circular separability filter shown in FIG. 17. Therefore the circular separability filter will be explained in detail.

Figure 17:
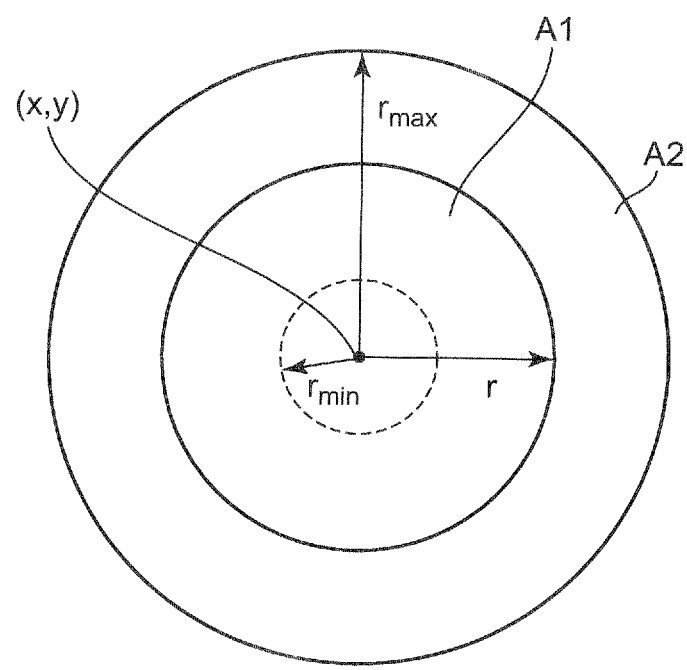
FIG. 17 is a drawing for explaining a circular separability filter.

As shown in FIG. 17 the circular separability filter is composed of a circular inside region A1 whose radius is r and the center is located at the coordinates (x, y) and an outside region A2 whose radius is $r_{max}$ and located concentrically outside the inside region A1. The circular separability filter calculates separability of pixels in the inside region A1 and the outside region A2. The separability is an index value to indicate a degree of separation of amount of image features between the inside region A1 and the outside region A2. A set of the image features such as a pixel value (brightness), color component and hue in the total region are divided into the region A1 and the region A2 and the degree of separation is calculated. Specifically, the separability η is calculated by the following formula 3.

$$\eta = \frac{\sigma_b^2}{\sigma_T^2}$$ (Formula 3)

$$\sigma_b^2 = n_1(\overline{P_1} - \overline{P_m})^2 + n_2(\overline{P_2} - \overline{P_m})^2$$

$$\sigma_T^2 = \sum_{i=1}^{N}(P_i - \overline{P_m})^2$$

where "N" is the total number of pixels in the regions A1 and A2,
"n1" is the number of pixels in the region A1,
"n2" is the number of pixels in the region A2,
"$\sigma_T$" is a variance of the total regions A1 and A2,
"$\sigma_b$" is a variance between the region A1 and the region A2,
"$P_i$" is brightness (pixel value) at a position of i,
"$P_1$" with overbar is an average brightness (average pixel value) of the region A1,
"$P_2$" with overbar is an average brightness (average pixel value) of the region A2, and
"$P_m$" with overbar is an average brightness (average pixel value) of the total regions A1 and A2.

The separability η is a ratio of deviation between the inside region A1 and the outside region A2 to the deviation of the total regions A1 and A2. The separability η is normalized and thus it ranges up to 1 (η is larger than zero and equal to or smaller than 1). As the amount of image features separates more between the inside region A1 and the outside region A2, the separability η becomes large. When the amount of features separates most between the inside region A1 and the outside region A2, the separability η becomes maximum. Therefore, by changing the center position (x, y) of the circular separability filter within a predetermined range (around the initial position ($x_{ini}$, $y_{ini}$), for example) in predetermined amount (one to several pixels, for example) while by changing the radius r of the circular separability filter within the range from the minimum value $r_{min}$ to the maximum value $r_{max}$ in predetermined amount (one to several pixels, for example), the set of the radius r and the center position (x, y) that results in the maximum separability η can be estimated as a radius and a center position of the ball image.

Specifically, as shown in FIG. 16, the image processing portion 7 sets a specified center position (x, y) and a specified radius r as initial values (initial position ($x_{ini}$, $y_{ini}$) and minimum value $r_{min}$, for example) (step S61). Next, the portion 7 calculates separability of the pixels of the inside region A1 and the outside region A2 by filtering the frame just before the impact the background of which is smoothed (the frame obtained by processing of the step S51 in FIG. 15) using a circular separability filter (step S62). Next, the portion 7 calculates separability between the pixels in sub-pixel unit by interpolating a separability distribution of each pixel (step S63). For example, the portion 7 interpolates the separability distribution by sub-pixel estimation method using a parabola approximation method. After that the portion 7 changes the center position (x, y) and a radius r of the circular separability filter in a determined value (step S65) and repeats the filtering and interpolation steps (step S64: NO). When the repetition of these steps ended (step S64: YES), the portion 7 estimates the radius r and the center position (x, y) that results in the maximum separability as the radius and the center position of the ball image just before impact (step S66). In other words, the portion 7 functions, by the program 13a, as the first estimating means 7d to estimate a radius and a position of a ball image just before impact in the step S66.

The radius and a coordinates of the center position estimated as above are designated as r1 and (x1, y1), respectively. The portion 7 outputs the radius r1 and the center position (x1, y1) to the reader/writer 10 and the reader/writer 10 records the r1 and the center position (x1, y1) in the memory 11. A picture indicating the r1 and the center position (x1, y1) by numerical numbers or a figure may be displayed on the display portion 9 by an instruction from the portion 7 and the central control portion 14 (see step A43 in FIG. 14).

Since the separability is a normalized value of variance of brightness and does not depend on a brightness value (pixel value), a radius and a center position of the ball image corresponding to a shape of the separability filter can be calculated with high accuracy. In addition, since the background of the ball image is smoothed before the filtering by the separability filter, noises or confusing images around the ball image are deleted and thus the accuracy of detection of the radius and center position of the ball image can be improved.

As shown in FIG. 4, once the radius r1 and the center position (x1, y1) of the image of the ball 202 just before impact is detected (step S4), the image processing portion 7 functions as the average color calculating means 7e by the program 13a (step S5). Specifically, the portion 7 calculates an average color (the color is designated as "aveB$_c$" hereinafter) of a plurality of pixels around the center position (x1, y1) of the frame just before impact (step S5). The portion 7 stores the calculated average color aveB$_c$ in the buffer memory 12. In the case of an RGB color space, an average color can be expressed by an average value of an R value (red color brightness value), an average value of a G value (green color brightness value) and an average value of a B value (blue color brightness value) of a plurality of pixels around the center position (x1, y1).

Next, the portion 7 detects a major axis, minor axis, center position and an angle of inclination of an image of the ball 202 after impact (step S6). The ball image after impact is deformed elliptical as shown in FIG. 6 and the angle of inclination is an inclination of a major axis from the horizontal line of an X direction.

Figure 18:
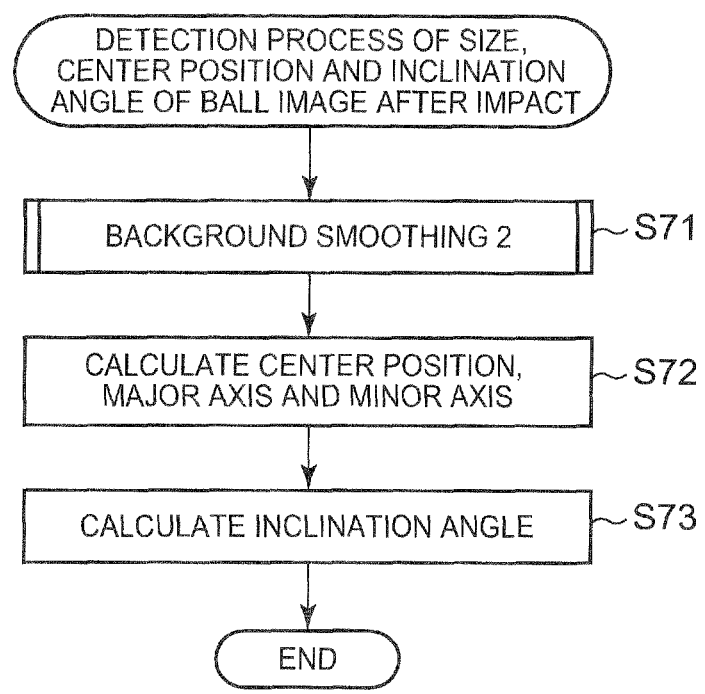
FIG. 18 is a flowchart of a sub-routine process performed by a computer of an imaging device.

FIG. 18 is a flowchart of the detection process (step S6) for the size, center position and inclination angle of the image of the ball 202 after impact. At first, the portion 7 smoothes the background of the frame after impact (a frame index of the frame is designated as "T" hereinafter) (step S71). The portion 7 then calculates the center position, major axis and minor axis of the ball image in the smoothed frame (step S72) and calculates the angle of inclination against the horizontal line (X direction) of the ball image in the frame (step S73).

Figure 19:
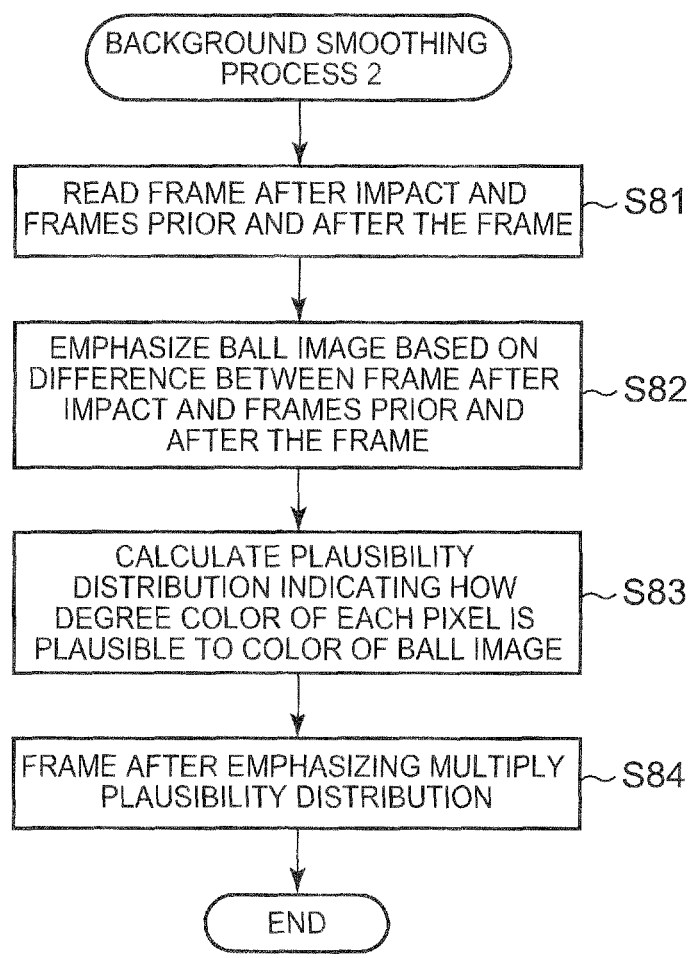
FIG. 19 is a flowchart of a sub-sub-routine process performed by a computer of an imaging device.

FIG. 19 is a flowchart of the background smoothing process 2 (step S71). The background smoothing process 2 (step S71) is performed by the portion 7 that functions as the second smoothing means 7f by the program 13a.

The portion 7 reads a frame after impact whose frame index is greater than N2 from the memory portion 11 and also reads frames that are one frame before the frame (a frame index is designated as "T−1") and one frame after the frame (a frame index is designated as "T+1") from the memory portion 11 (step S81), as shown in FIG. 19.

Figure 20:
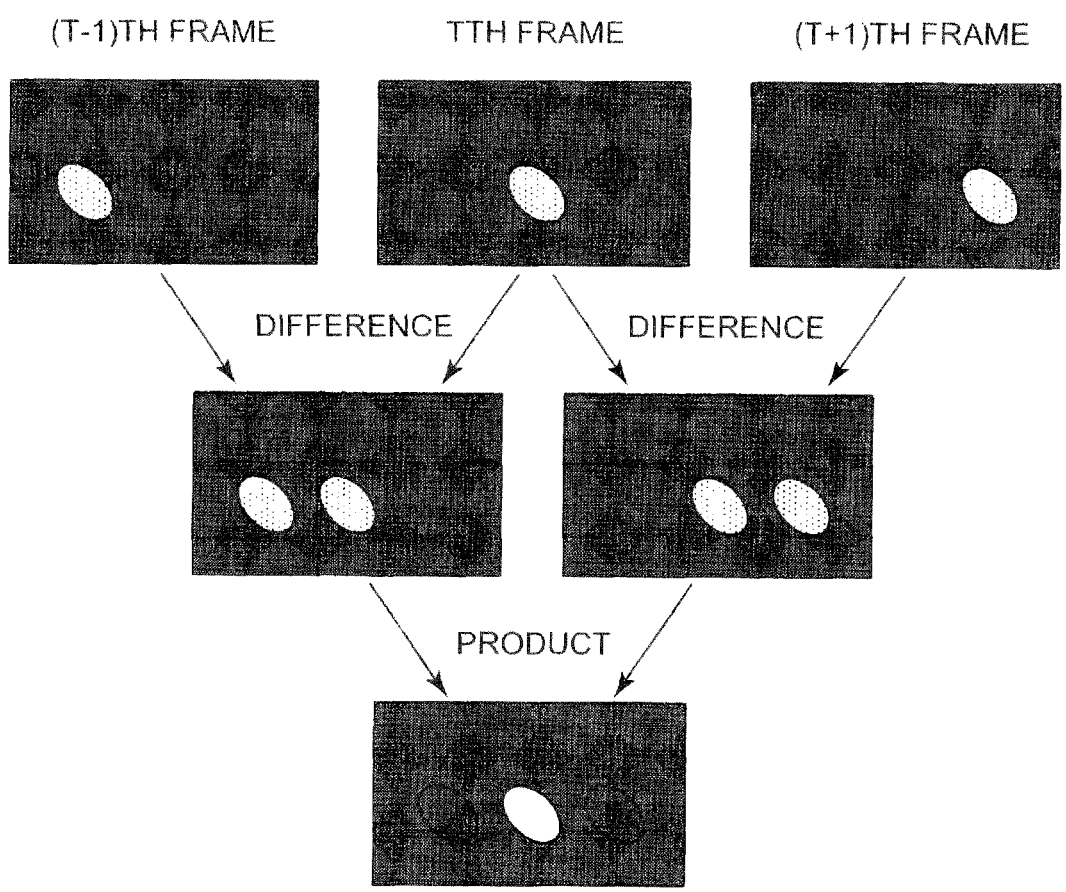
FIG. 20 is a drawing for explaining a smoothing processing of a background of a ball image.

Next, as shown in FIG. 20, the portion 7 calculates an absolute difference between the frame after impact and a frame one frame before the frame. That is, the portion 7 calculates absolute difference of pixel values of the corresponding pixels of the frame after impact and the frame one frame before that. The portion 7 calculates an absolute difference between the frame after impact and a frame one frame after the frame. That is, the portion 7 calculates absolute difference of pixel values of the corresponding pixels of the frame after impact and the frame one frame after that. The portion 7 then calculates, by the formula 4 below, the product (or the sum) of the two absolute differences (step S82) so as to emphasize the ball image in the frame after impact and enhance the contrast between the ball image and the background.

$$Mdif_T(x,y) = |f_{T-1}(x,y) - f_T(x,y)| \times |f_T(x,y) - f_{T+1}(x,y)| \quad \text{(Formula 4)}$$

The $f_T(x, y)$ is a pixel value of each pixel of the frame after impact, $f_{T-1}(x, y)$ is a pixel value of a pixel in a frame one before the frame, $f_{T+1}(x, y)$ is a pixel value of a pixel in a frame one after the frame and $Mdif_T(x, y)$ is a pixel value of a pixel in the image after enhancement of the ball image in the frame after impact.

Next, the portion 7 calculates plausibility of each pixel in the frame after impact (step S83). The plausibility is an indicator how degree a color (pixel value) of each pixel is plausible to the color of the ball image. Specifically, as shown by the formula 5 below, the portion 7 calculates an inverse (reciprocal number) of the sum of squares (L2 NORM) for each dimension of a vector from the point of the average color aveB$_c$ to a point of a pixel value of each pixel in the frame after impact in a color space as the plausibility $Cdif_T(x, y)$ of each pixel.

$$Cdif_T(x, y) = \frac{1}{L2NORM} \quad \text{(Formula 5)}$$
$$= \frac{1}{(C_1 - C_{T1}(x, y))^2 + (C_2 - C_{T2}(x, y))^2 + (C_3 - C_{T3}(x, y))^2}$$

where "$C_1$", "$C_2$" and "$C_3$" are values of color elements of aveB$_c$, and $C_{T1}(x, y)$, $C_{T2}(x, y)$ and $C_{T3}(x, y)$ are elements of pixel value of a pixel at a position of (x, y).

For example, in the case where a color space of the frame after impact is an RGB color space, $C_1$ and $C_{T1}(x, y)$ are R values, $C_2$ and $C_{T2}(x, y)$ are G values and $C_3$ and $C_{T3}(x, y)$ are B values. The closer the color (pixel value) of the pixel in the frame after impact to the average color aveB$_c$, the higher the plausibility $Cdif_T(x, y)$ becomes.

Next, the portion 7 calculates the product of the enhanced frame ($Mdif_T(x, y)$ distribution) calculated at the step S82 and the distribution of the plausibility $Cdif_T(x, y)$ calculated at the step S83 (step S84). The portion calculates an image "estImg$_T$" of the enhanced ball image with smoothed background in the frame after impact.

$$estImg_T(x,y) = Mdif_T(x,y) \times Cdif_T(x,y) \quad \text{(Formula 6)}$$

Figure 21:
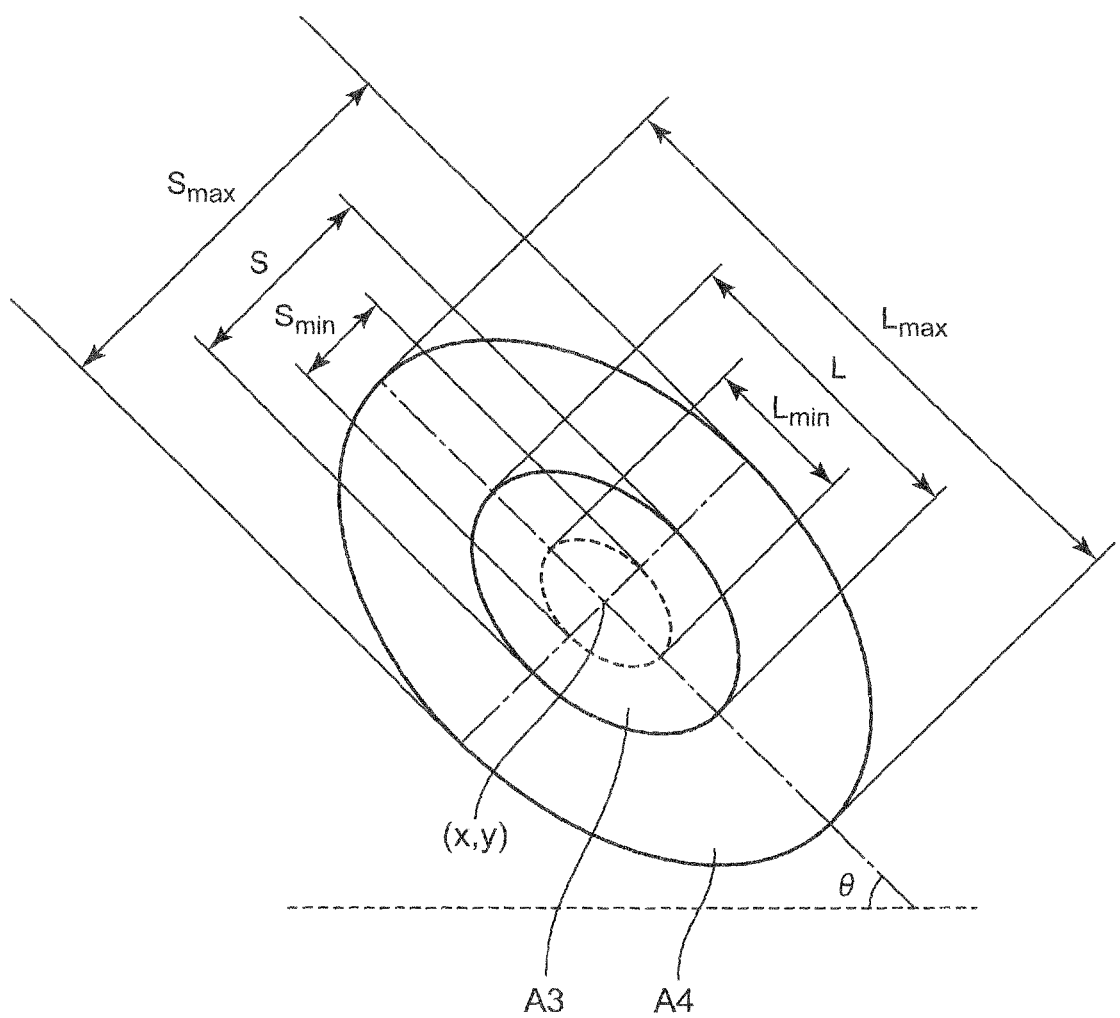
FIG. 21 is a drawing for explaining an ellipse separability filter.

After calculation of the image estImg$_T$, the portion 7 calculates a center position, major axis, minor axis and angle of inclination of the ball image in the image estImg$_T$ (step S72 and step S73). The portion 7 calculates the separability of each pixel using an ellipse separability filter as shown in FIG. 21 as the ellipse separability calculating means 7g by the program 13a in the processing of the steps S72 and S73. Therefore, an ellipse separability filter will be explained.

An ellipse separability filter is composed of an inside region A3 of an ellipse shape having a major axis L, a minor axis S and a center at a coordinates (x, y) and an outside region A4 located adjacently and concentrically outside the inside region A3 and having a major axis $L_{max}$ and a minor axis $S_{max}$. An outer circumferential ellipse of the inside region A3 and an outer circumferential ellipse of the outside region A4 are similar figures. The major axis L and the major axis $L_{max}$ are inclined to the horizontal line in the X direction and the angle of the inclination is θ. The ellipse separability filter is used for calculating separability of pixels between the inside region A3 and the outside region A4 as the circular separability filter although the shape is different from the separability filter. Therefore, the calculation formula of the separability η for the circular separability filter can be applied for the ellipse separability filter. Therefore, by changing the major axis L of the ellipse separability filter within the range from the minimum value $L_{min}$ to the maximum value $L_{max}$ in predetermined amount (one to several pixels, for example), changing the minor axis S within the range from the minimum value $S_{min}$ to the maximum value $S_{max}$ in predetermined amount (one to several pixels, for example), changing the center position (x, y) in predetermined amount (one to several pixels, for example) and changing the inclination angle θ in predetermined amount, the set of the major axis L, the minor axis S, the center position (x, y) and the inclination angle θ that results in the maximum separability η can be estimated as a major axis, minor axis, center position and inclination angle of the ball image.

A process (step S72) for calculating the center position, major axis and minor axis of the ball image using the ellipse separability filter will be explained.

At first the portion 7 assigns specified values as initial values of the center position (x, y), major axis L, minor axis S and inclination angle θ of the ellipse separability filter. Since the approximate deformation of the image of the moving ball 202 is already determined, the initial value of the inclination angle θ is determined based on the approximated deformation.

Next, the portion 7 calculates the separability of each pixel between the inside region A3 and the outside region A4 by filtering the image estImg$_T$ using the ellipse separability filter.

Next, the portion 7 calculates separability in sub-pixel unit between the pixels by interpolating the separability distribution of each pixel.

The portion 7 then repeats the filtering and interpolating processes by changing the center position (x, y), major axis L and the minor axis S in predetermined amount while the inclination angle θ is maintained. Since the inclination angle θ is maintained, the number of process repetition can be reduced and it contributes reduction of the load of the calculation process. When changing the major axis L and the minor axis S, it is preferable to keep the ratio of the major axis L to the minor axis S so as to keep the outer circumferential ellipse of the inside region A3 and the outer circumferential ellipse of the outside region A4 in similar figures. However, it is not necessary to keep the ratio of the major axis L to the minor axis S when changing them.

After finishing the repeated process of the separability calculation above explained, the portion 7 functions as the second estimating means 7h by the program 13a. The portion 7 as the second estimating means 7h estimates the set of the major axis L, minor axis S and center position (x, y) that results in the maximum separability as a major axis, minor axis and center position of the ball image after impact.

The estimated values of the major axis, minor axis and center position are designated as L2, S2 and (x2, y2), respectively. The estimated major axis L2, minor axis S2 and center position (x2, y2) are stored in the memory portion 11 by the image processing portion 7 and the reader/writer 10.

A process (step S73) to calculate the inclination angle of the ball image using the ellipse separability filter will be explained.

At first, the portion 7 sets the center position (x, y), major axis L and minor axis S as (x2, y2), L2 and S2, respectively. The portion 7 sets a specified initial value for the inclination angle θ.

Next, the portion 7 calculates the separability of each pixel between the inside region A3 and the outside region A4 by filtering the image estImg$_T$ using the ellipse separability filter.

Next, the portion 7 calculates separability in sub-pixel unit between the pixels by interpolating the separability distribution of each pixel.

The portion 7 then repeats the filtering and interpolating processes by changing the inclination angle θ in predetermined amount while the center position (x2, y2), major axis L2 and minor axis S2 of the ellipse separability filter are maintained. Since the center position (x, y), major axis L and minor axis S are maintained, the number of process repetition can be reduced and it contributes reduction of the load of the calculation process.

After repetition of the process of the above separability calculation, the portion 7 plays a role as the second estimating means 7h by the program 13a. The portion 7 as the second estimating means 7h estimates the inclination angle θ that results in the maximum separability among separabilities obtained by the repeated calculations as the inclination angle of the ball image after impact. The inclination angle estimated in such a manner is designated as θ2 hereinafter. The estimated inclination angle θ2 is recorded in the memory portion 11 by the portion 7 and the reader/writer 10.

In the above embodiment the separability calculation process is divided into two steps, one is the step S72 in which the inclination angle θ is maintained and the other is the step S73 in which the major axis L, the minor axis S and the center coordinates (x, y) are maintained. However, it is possible to repeat the filtering process and the interpolating process to calculate the separability by changing the center position (x, y), major axis L, minor axis S and inclination angle θ of the ellipse separability filter in predetermined amount instead of maintaining any of the inclination angle θ, major axis L, minor axis S and center position (x, y). Even in such a case, the portion 7 estimates a set of major axis L, minor axis S, center position (x, y) and inclination angle θ that results in the maximum separability as a set of the major axis, minor axis, center position and inclination angle of the ball image after impact.

The portion 7 performs the calculations of a major axis, minor axis, center position and inclination angle of a ball image after impact (see FIG. 18) for two or more frames after N2th frame (impact frame). Particularly, the portion 7 performs the calculations for two or more successive frames after N2th frame. It is possible to perform the calculations for all of the frames after N2th frame.

Because the shape of the regions A3 and A4 of the ellipse separability filter is an ellipse and the ball image is also deformed into an ellipse shape, it becomes possible to calculate accurately the major axis, minor axis, center position and inclination angle of a ball image. In addition, since the ball image is enhanced before the filtering by the ellipse separability filter and the background is smoothed, the detection accuracy of the major axis, minor axis, center position and inclination angle of a ball image can be more increased.

Next, as shown in FIG. 4, the portion 7 detects a rotation angle of the ball based on a frame after impact and a frame (this frame is also after impact) just before the frame (step S7).

Figure 22:
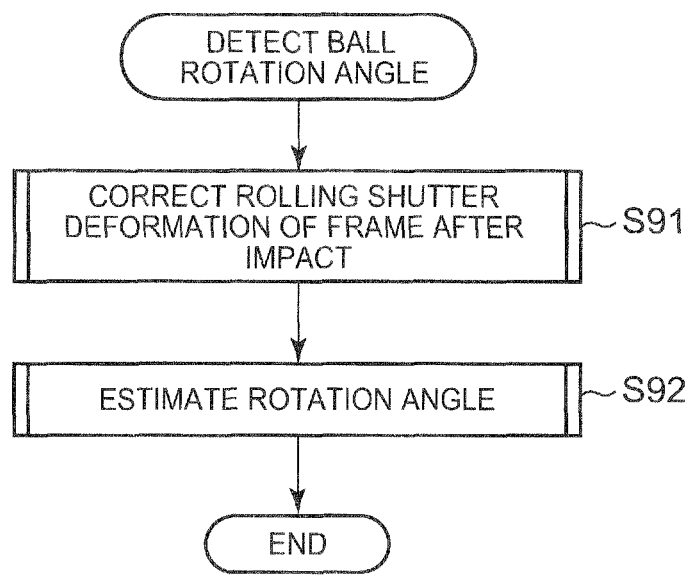
FIG. 22 is a flowchart of a sub-routine process performed by a computer of an imaging device.

FIG. 22 is a flowchart explaining the process (step S7) to detect a rotation angle of the ball. The portion 7, as shown in FIG. 22, corrects the ball image in the frame into circular based on a difference between center coordinates of the ball images that are elliptically deformed in the frames after impact (step S91). The portion 7 performs the processing to correct the ball image into circular (step S91) for two or more frames after the N2th frame (impact frame). Particularly, the portion 7 performs the processes for two or more successive frames after N2th frame. It is possible to perform the correction processes for all of the frames after N2th frame.

The portion 7 estimates the rotation angle of the ball based on the ball images corrected into circular in the two frames after impact (step S92).

Figure 23:
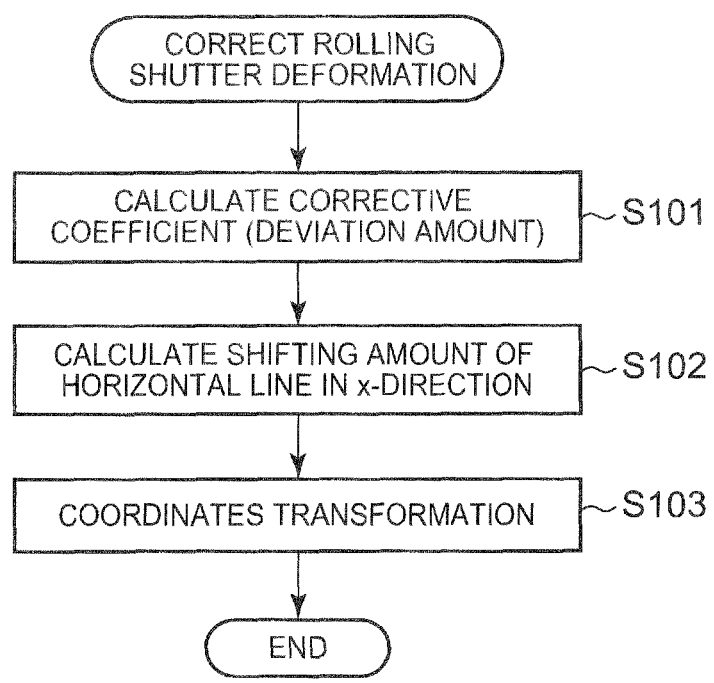
FIG. 23 is a flowchart of a sub-sub-routine process performed by a computer of an imaging device.

FIG. 23 is a flowchart explaining the correction processing (step S91) to correct the deformed ball image into a circle.

The portion 7 calculates a corrective coefficient based on a difference of the x-coordinates of the center of the ball images of the frame after impact and the next frame (step S101) by functioning as a deviation amount calculating means 7i by the program 13a. Specifically, the portion 7 calculates the corrective coefficient based on the following formula 7.

$$rsd(T) = \frac{x2(T+1) - x2(T)}{Sy} \quad \text{(Formula 7)}$$

Where "rsd(T)" is a corrective coefficient for a T-th frame after impact. The "x2(T)" and "x2(T+1)" are calculated by the process shown in FIG. 18. Sy is the number of horizontal lines. The corrective coefficient rsd(T) is a deviation caused by a rolling shutter deformation and indicates a degree of deviation in the x-direction between vertically adjacent horizontal lines in the frame after impact.

Next, the portion 7 calculates an amount of shift of the horizontal line in the x-direction according to the following formula 8 by functioning as a shift calculation means 7j by the program 13a (step S102).

$$dx(y) = |y \times rsd(T)| \quad \text{(Formula 8)}$$

Where "y" is a line number of the line from the top horizontal line and "dx(y)" is an amount of shift of y-th horizontal line to be shifted in the x-direction.

Next, the portion 7 functions as a deformation correction means 7k by the program 13a. The portion 7 as the deformation correction means 7k transforms the x-coordinate of each frame of the frames after impact so as to shift each horizontal line in a frame after impact by dx(y) in the x-direction (step S103). The portion 7 interpolates between pixels of the frame before coordinates transformation using an interpolating method such as a bilinear interpolation method, bicubic interpolation method, and the like while the portion 7 transforms coordinates.

Figure 24A:
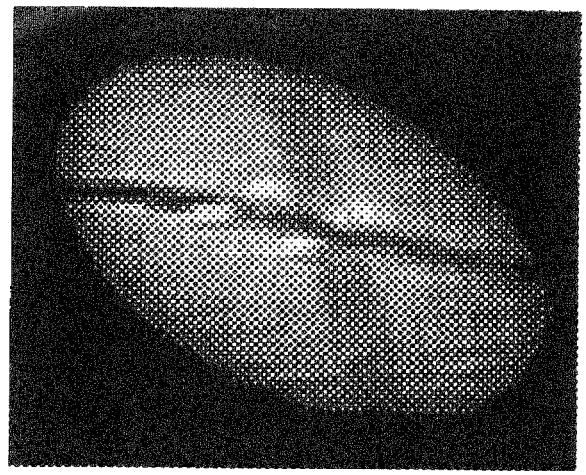
FIG. 24A is a ball image before a deformation correction.
Figure 24B:
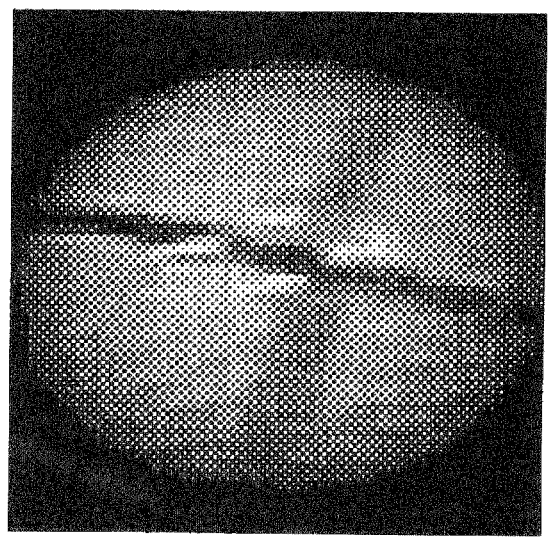
FIG. 24B is a ball image after a deformation correction.

As a result, the ball image elliptically deformed as shown in FIG. 24A is corrected into a circle as shown in FIG. 24B.

Figure 25:
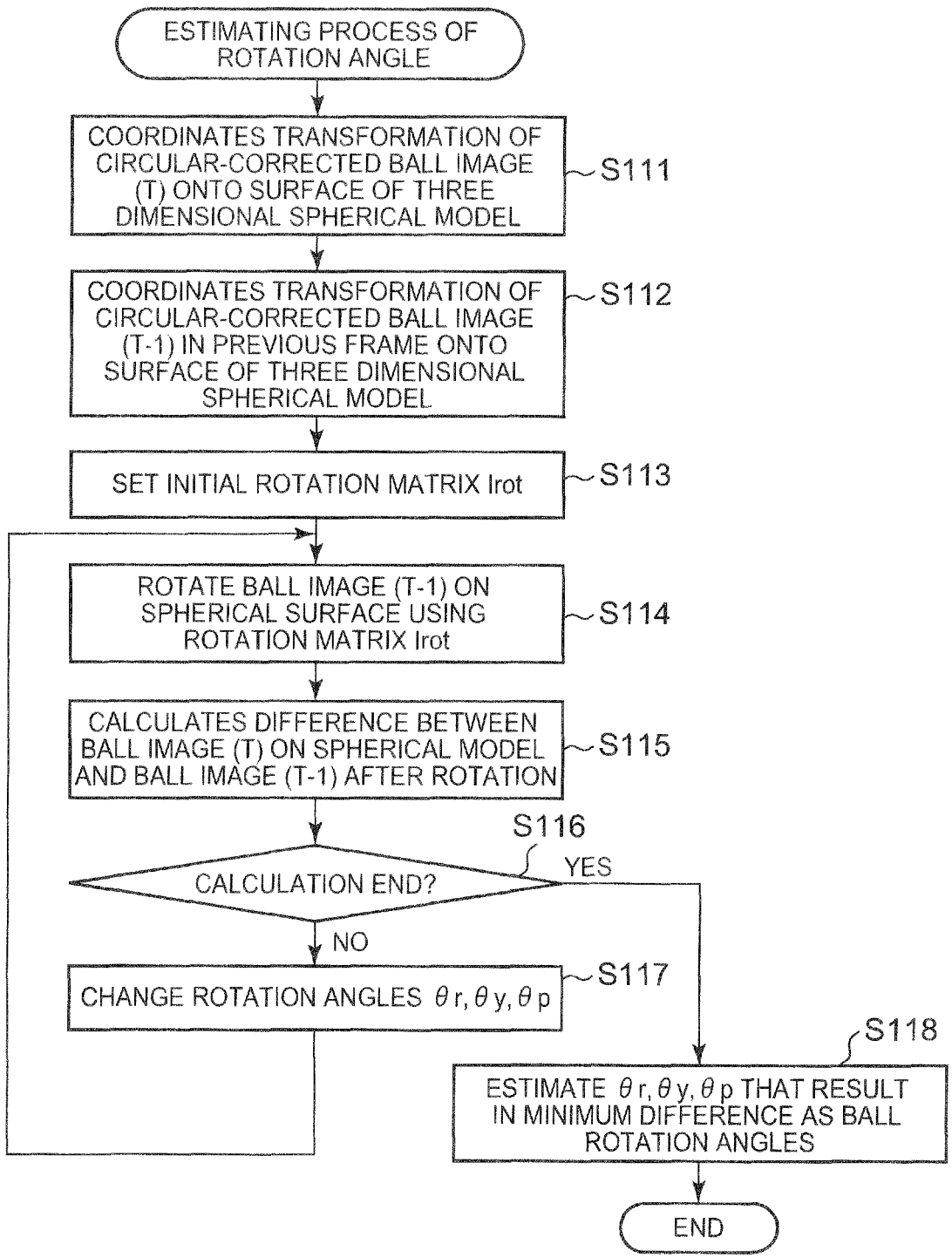
FIG. 25 is a flowchart of a sub-sub-routine process performed by a computer of an imaging device.

FIG. 25 is a flowchart explaining a process (step S92) to estimate a rotation angle of the ball based on the two successive frames in which the ball image are corrected into a circle.

At first, the portion 7 transforms the circular-corrected ball image in the frame onto a surface of three dimensional spherical model expressed by the rectangular (X, Y, Z) coordinates system (step S111) by functioning as a coordinates transforming means 7m by the program 13a. It is preferable that the x-coordinate before transformation and the x-coordinate after transformation are parallel and the y-coordinate before transformation and the y-coordinate after transformation are parallel in this step. Similarly, the portion 7 transforms the circular-corrected ball image in the previous frame onto a surface of three dimensional spherical model expressed by the rectangular (X, Y, Z) coordinates system (step S112). The portion 7 interpolates between pixels of the ball image before coordinates transformation using an interpolating method such as a bilinear interpolation method, bicubic interpolation method, and the like while the portion 7 transforms coordinates.

Next, the portion 7 estimates the rotation angle between the ball images (coordinates transformed into three dimensional spherical model) of the two frames by functioning as a rotation angle estimation means 7n by the program 13a.

Specifically, the portion 7 sets a following rotation matrix Irot in a specified initial value (step S113). That is, the portion 7 sets rotation angles θr, θy and θp in the following formula 9 in specified initial values.

$$Irot = \begin{pmatrix} m_{00} & m_{01} & m_{02} \\ m_{10} & m_{11} & m_{12} \\ m_{20} & m_{21} & m_{22} \end{pmatrix} \quad \text{(Formula 9)}$$

-continued $m_{00} = \cos\theta y \times \cos\theta p$ $m_{10} = \cos\theta y \times \sin\theta p \times \sin\theta r - \sin\theta y \times \cos\theta r$ $m_{20} = \cos\theta y \times \sin\theta p \times \cos\theta r + \sin\theta y \times \sin\theta r$ $m_{01} = \sin\theta y \times \cos\theta p$ $m_{11} = \sin\theta y \times \sin\theta p \times \sin\theta r + \cos\theta y \times \cos\theta r$ $m_{21} = \sin\theta y \times \sin\theta p \times \cos\theta r - \cos\theta y \times \sin\theta r$ $m_{02} = -\sin\theta y \times (-\cos\theta p)$ $m_{12} = \cos\theta p \times \sin\theta r$ $m_{22} = \cos\theta p \times \cos\theta r$ Where "θr" is a rotation angle around Z-axis (pitch angle), "θy" is a rotation angle around Y-axis (yaw angle) and "θp" is a rotation angle around X-axis (roll angle).

Next, the portion 7 transforms, by the following formula 10, the ball image by the rotation matrix Irot by rotating the ball image on the surface of the three dimensional spherical model generated at the step S112 (step S114).

$$\begin{pmatrix} X^* \\ Y^* \\ Z^* \end{pmatrix} = Irot \cdot \begin{pmatrix} X \\ Y \\ Z \end{pmatrix} \quad \text{(Formula 10)}$$

Where X, Y and Z are coordinate values before transformation and X*, Y* and Z* are coordinate values after transformation. The portion 7 interpolates between pixels of the ball image before coordinates transformation using an interpolating method such as a bilinear interpolation method, bicubic interpolation method, and the like while the portion 7 transforms coordinates.

Next, the portion 7 calculates a difference between the ball image on the surface of the three dimensional spherical model generated at the step S111 and the ball image after transformation by the step S114 (step S115).

After that, the portion 7 repeats the coordinates transformation and the difference calculation steps by changing the pitch angle θr, yaw angle θy and roll angle θp of the rotation matrix Irot in predetermined amount (step S116: NO). When the repetition processes ended (step S116: YES), the portion 7 estimates a set of rotation angles θr, θy and θp that results in the minimum difference as a set of rotation pitch angle, rotation yaw angle and rotation roll angle of the ball per one frame (step S118). The rotation pitch angle, rotation yaw angle and rotation roll angle obtained by the process above explained in the T-th frame are designated as the θr2, θy2 and θp2, respectively.

The portion 7 performs the process estimating the rotation pitch angle, rotation yaw angle and rotation roll angle (step S92) for at least one frame after the N2th impact frame. It is of course possible to perform the estimation process for all frames after the n2th frame.

After detection (step S7) of the rotation pitch angle θr2, rotation yaw angle θy2 and rotation roll angle θp2 after impact, as shown in FIG. 4, the portion 7 calculates moving state of the ball 202 after impact based on the image capturing conditions and the calculation results (step S8). Specifically, the portion 7 calculates a speed (moving speed), vertical take-off angle, horizontal take-off angle, backspin speed (over-spin speed) and sidespin speed of the ball 202.

In concrete, the portion 7 functions as a speed calculating means 7p by the program 13a and calculates a speed of the ball 202 from the center coordinates of the ball images in two frames after impact by the following formula 11.

$$V_x = \frac{|x_a - x_b| \times F_{rate}}{N3}$$ (Formula 11)

$$V_y = \frac{|y_a - y_b| \times F_{rate}}{N3}$$

Where $(x_a, y_a)$ is center coordinates of the ball image in a specified frame after impact, $(x_b, y_b)$ is center coordinates of the ball image in a previous frame, "N3" is an absolute difference between frame indices of the frames (that is, the number of frames between the frames), "$V_x$" is a speed (pixel/sec) in the x-direction, "$F_{rate}$" is a frame rate and "$V_y$" is a speed (pixel/sec) in the y-direction. The center coordinates $(x_a, y_a)$ and $(x_b, y_b)$ are detected at the step S6 in FIG. 4. When the ball speed is calculated based on center coordinates of the ball images in successive two frames, the value of N3 is 1. It is possible to calculate the $V_x$ and $V_y$ for each frame after impact. It is also possible to calculate actual ball speeds by converting the speeds $V_x$ and $V_y$ in the image into actual speeds based on the image capturing conditions, an actual ball diameter, a diameter of the ball image, and the like. The $(x_b, y_b)$ may be a center coordinates of the ball image in a frame before impact (calculated in the step S4 in FIG. 4) and N3 may be the number of frames from the impact frame to the frame after impact that the center coordinates $(x_a, y_a)$ is calculated.

The portion 7 functions as a vertical take-off angle calculating means 7s by the program 13a and calculates a vertical take-off angle based on the center coordinates of the ball images in two frames after impact by the following formula 12. The vertical take-off angle is an angle of the moving ball in an up or down direction with respect to the horizontal line viewed from the image pickup direction D.

$$\tan\alpha = \frac{y_a - y_b}{x_a - x_b}$$ (Formula 12)

Where "α" is a vertical take-off angle (rad).

The portion 7 functions as a spin speed calculating means 7t by the program 13a and calculates a spin speed of the ball 202 after impact. Specifically, the portion 7 calculates a backspin speed (over-spin speed) by the rotation pitch angle θr2 after impact and the frame rate $F_{rate}$ and calculates a sidespin speed by the rotation yaw angle θy2 after impact and the frame rate $F_{rate}$.

$$\phi = \theta r2 \times F_{rate}$$

$$\omega = \theta y2 \times F_{rate}$$ (Formula 13)

Where "φ" is a backspin speed (rad/sec) and "ω" is a sidespin speed (rad/sec).

The portion 7 calculates the horizontal take-off angle based on a difference of the major axis or minor axis of the ball images in two frames after impact. The horizontal take-off angle is an angle of the ball moving in a right or left direction viewed from above with respect to a vertical plane orthogonal to the image pickup direction D of the lens unit 1.

$$\tan\beta = \frac{L_b - L_a}{L_b \times \tan\left(\frac{x_a - x_c}{Sx} \times A_H\right) - L_a \times \tan\left(\frac{x_b - x_c}{Sx} \times A_H\right)}$$ (Formula 14)

or $$\tan\beta = \frac{S_b - S_a}{S_b \times \tan\left(\frac{x_a - x_c}{Sx} \times A_H\right) - S_a \times \tan\left(\frac{x_b - x_c}{Sx} \times A_H\right)}$$

Where β is a horizontal take-off angle (rad), $(x_a, y_a)$ is a center coordinates of the ball image in a specified frame after impact, $(x_b, y_b)$ is a center coordinates of the ball image in a previous frame (after impact), $(x_c, y_c)$ is a center coordinates of a frame, $S_x$ is the number of vertical lines, $A_H$ is a horizontal view angle of an image pickup means of the imaging device 100, $L_a$ is a major axis of the ball image whose center coordinates is the $(x_a, y_a)$ in the specified frame, $S_a$ is a minor axis of the ball image whose center coordinates is the $(x_a, y_a)$ in the specified frame, Lb is a major axis of the ball image whose center coordinates is the $(x_b, y_b)$ in the previous frame, and $S_b$ is a minor axis of the ball image whose center coordinates is the $(x_b, y_b)$ in the previous frame. The $L_a$, $S_a$, $L_b$ and $S_b$ are detected in the step S6 in FIG. 4.

Figure 26:
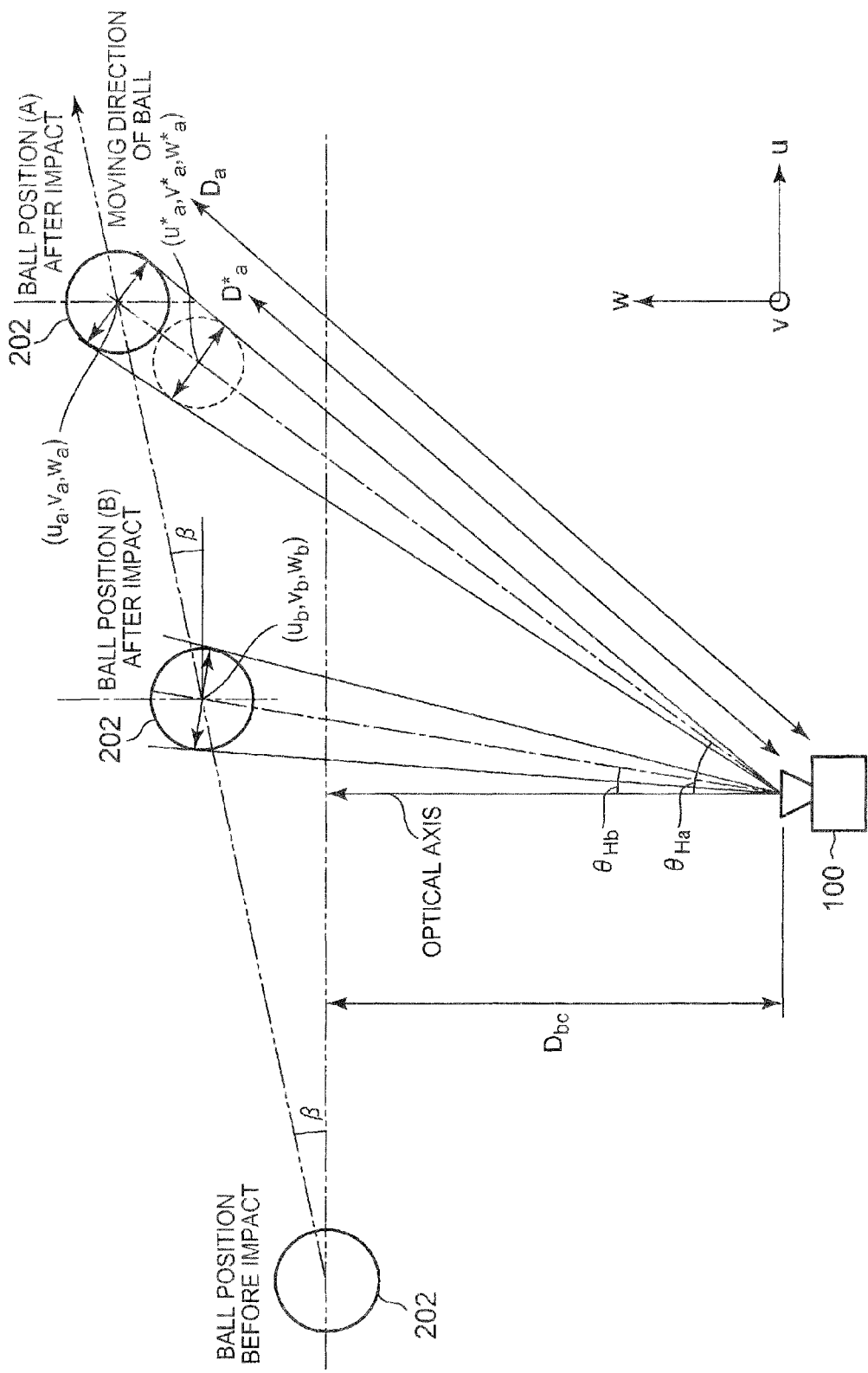
FIG. 26 is a drawing for explaining a calculation of a horizontal take-off angle of a ball.

The calculation formula for β is explained with reference to FIG. 26. A three dimensional coordinates system (u, v, w) is set with respect to the image pickup means (the lens unit 1 and the electronic imaging portion 3) of the imaging device 100 and a position of the image pickup means is set as an origin point. The u-direction is parallel to the horizontal line of the electronic imaging portion 3, the v-direction is parallel to the vertical direction of the electronic imaging portion 3 and the w-direction is orthogonal to the horizontal direction and vertical direction of the portion 3 and parallel to the image pickup direction D. A center coordinates of the ball image in a frame captured when the ball 202 after impact is at a position A is $(x_a, y_a)$ and a center coordinates of the ball image in a previous frame captured when the ball 202 after impact is at a position B is $(x_b, y_b)$. The positions A and B are center positions of the ball 202 and uvw coordinates of the positions A and B are $(u_a, v_a, w_a)$ and $(u_b, v_b, w_b)$, respectively. An image pickup distance $D_{bc}$ is a distance from the image pickup means (lens unit 1 and electronic imaging portion 3) of the imaging device 100 to a subject plane that is orthogonal to an optical axis of the image pickup means of the imaging device 100 and passes through the ball 202 before impact.

Angles (horizontal angle $\theta_{Ha}$ and vertical angle $\theta_{Va}$) which a connecting line between the ball 202 at the A position and the image pickup means of the imaging device 100 forms with the optical axis as a standard line and angles (horizontal angle $\theta_{Hb}$ and vertical angle $\theta_{Vb}$) which a connecting line between the ball 202 at the B position and the image pickup means of the imaging device 100 forms with the optical axis are expressed by the following formula 15.

$$\theta_{Ha} = \frac{x_a - x_c}{Sx} \times A_H$$ (Formula 15)

$$\theta_{Va} = \frac{y_a - y_c}{Sy} \times A_V$$

$$\theta_{Hb} = \frac{x_b - x_c}{Sx} \times A_H$$

$$\theta_{Vb} = \frac{y_b - y_c}{Sy} \times A_V$$

Where $A_H$ is a horizontal view angle of the image pickup means of the imaging device 100 and $A_V$ is a vertical view angle of the image pickup means of the imaging device 100.

The coordinates ($u_b$, $v_b$, $w_b$) of the position B can be approximated as follows.

$$u_b \approx D_{bc} \times \tan(\theta_{Hb})$$

$$v_b \approx D_{bc} \times \tan(\theta_{Vb})$$

$$w_b \approx D_{bc} \quad \text{(Formula 16)}$$

Coordinates ($u_a^*$, $v_a^*$, $w_a^*$) of an intersection of the connecting line between the ball 202 at the A position and the image pickup means of the imaging device 100 and a plane parallel to the u-direction and passing through the position B is approximated as follows.

$$u_a^* \approx D_{bc} \times \tan(\theta_{Ha})$$

$$v_a^* \approx D_{bc} \times \tan(\theta_{Va})$$

$$w_a^* \approx D_{bc} \quad \text{(Formula 17)}$$

The coordinates ($u_a$, $v_a$, $w_a$) of the position A is expressed as follows.

$$u_a = u_a^* \times \frac{D_a}{D_a^*} \quad \text{(Formula 18)}$$

$$v_a = v_a^* \times \frac{D_a}{D_a^*}$$

$$w_a = w_a^* \times \frac{D_a}{D_a^*}$$

Where $D_a$ is a distance between the image pickup means of the imaging device 100 and the position A and $D_a^*$ is a distance between the image pickup means of the imaging device 100 and the coordinates ($u_a^*$, $v_a^*$, $w_a^*$). A ratio of $D_a$ to $D_a^*$ is expressed by the following formula 19.

$$\frac{D_a}{D_a^*} = \frac{L_b}{L_a} = \frac{S_b}{S_a} \quad \text{(Formula 19)}$$

Therefore, the horizontal take-off angle $\beta$ is expressed as follows.

$$\tan\beta = \frac{w_a - w_b}{u_a - u_b} \quad \text{(Formula 20)}$$

$$= \frac{L_b - L_a}{L_b \times \tan\left(\frac{x_a - x_c}{Sx} \times A_H\right) - L_a \times \tan\left(\frac{x_b - x_c}{Sx} \times A_H\right)}$$

$$= \frac{S_b - S_a}{S_b \times \tan\left(\frac{x_a - x_c}{Sx} \times A_H\right) - S_a \times \tan\left(\frac{x_b - x_c}{Sx} \times A_H\right)}$$

After calculations of the speed, horizontal take-off angle, vertical take-off angle, backspin speed and sidespin speed of the ball 202, the portion 7 outputs these results to the reader/writer 10 and the reader/writer 10 records the results in the memory portion 11. A picture indicating the calculated results by numeric values or illustrations may be displayed on the display portion 9 by the command from the portion 7 and the central control portion 14 (step S9).

According to an exemplary embodiment above explained, the speed, vertical take-off angle and horizontal take-off angle of the ball 202 can be calculated accurately because the calculations of the major axis, minor axis, center position and inclination angle of the elliptically deformed ball image can be carried out accurately by using an ellipse separability filter.

In addition, by virtue of the correction of the elliptically deformed ball image into a circular image, the backspin speed and sidespin speed can be calculated accurately.

Second Exemplary Embodiment

Figure 27:
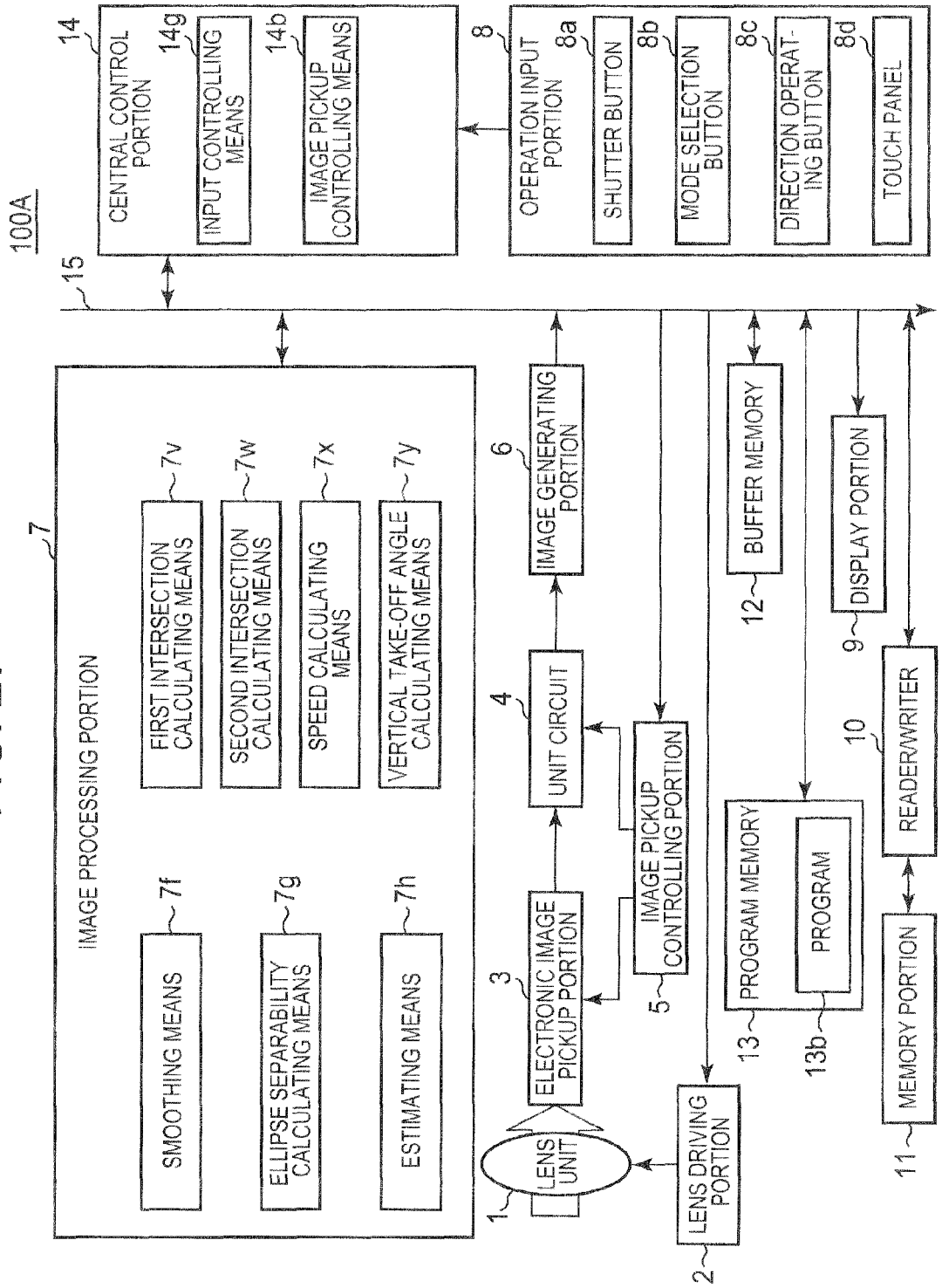
FIG. 27 is a structural block diagram of an imaging device according to a second exemplary embodiment of the invention.

FIG. 27 is a schematic block diagram of an imaging device 100A according to a second exemplary embodiment of the present invention. Portions of the imaging device 100A of a second exemplary embodiment corresponding to those of the imaging device 100 of a first exemplary embodiment are designated by the same symbols.

The imaging device 100A differs from the imaging device 100 such that the program 13b stored in the program memory 13 is different from a program 13a and that the functions of the central control portion 14 and the image processing portion 7 are different because of the difference between the program 13a and the program 13b.

According to the imaging device 100A of a second exemplary embodiment, the program 13b makes the central control portion 14 function as an input controlling means 14g and an image pickup controlling means 14b. The image pickup controlling means 14b is the same as that of a first exemplary embodiment. The input controlling means 14g will be explained later in detail.

The program 13b makes the image processing portion 7 function as a smoothing means 7f, ellipse separability calculating means 7g, estimating means 7h, first intersection calculating means 7v, second intersection calculating means 7w, speed calculating means 7x and vertical take-off angle calculating means 7y. The smoothing means 7f, ellipse separability calculating means 7g and estimating means 7h are the same as those of a first exemplary embodiment. The first intersection calculating means 7v, second intersection calculating means 7w, speed calculating means 7x and vertical take-off angle calculating means 7y will be explained later in detail.

Figure 28:
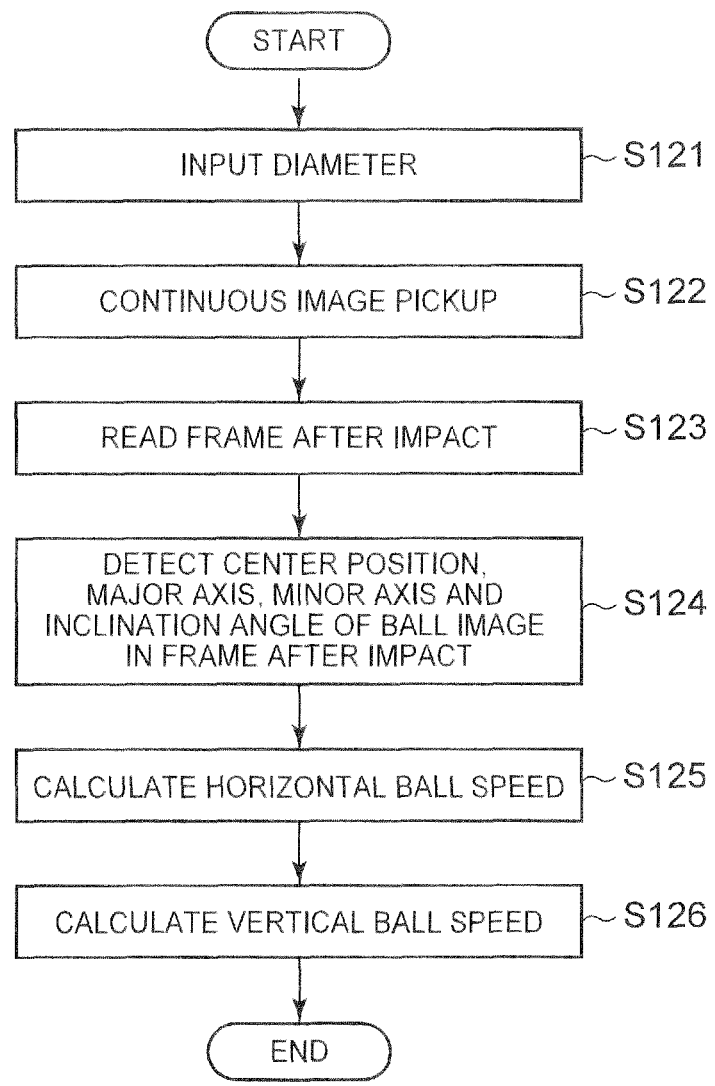
FIG. 28 is a flowchart of a main-routine process performed by a computer of an imaging device.

A flow of the processes performed by the central control portion 14 and the image processing portion 7 according to the program 13b will be explained with reference to the flowchart in FIG. 28.

At first the central control portion 14 plays a role as the input controlling means 14g by the program 13b and stores data input via the operation input portion 8 in the buffer memory 12 and the like. Specifically, an operator inputs a diameter or radius of the ball 202 by operating the operation input portion 8. The central control portion 14 then stores the input diameter or double radius into the buffer memory 12 (step S121). The diameter may be stored in the memory portion 11 or the program memory 13 in advance, or it may be incorporated in the program 13b.

Next, the central control portion 14 plays a role as the image pickup controlling means 14b by the program 13b and picks up images continuously. Specifically, the portion 14 makes the electronic image pickup portion 3 capture images continuously through the image pickup controlling portion 5 (step S122) when an user pressed down a shutter button 8a. In this time a hitter hits the ball 202. The continuous image pickup process (step S122) is the same process as the continuous image pickup process (step S2) in a first exemplary embodiment. It is possible to set a trigger sensor to detect an impact of the ball 202 near the ball before impact and structure the system such that upon detection of the impact of the ball 202 by the sensor and input of the trigger signal to the central control portion 14, the portion 14 makes the electronic image pickup portion 3 pick up images continuously through the image pickup controlling portion 5. It may be also possible to capture one still image (frame) of the ball 202 after impact by multiple exposures using a high-speed shutter instead of capturing continuous images.

Next, the image processing portion 7 reads out the frame after impact from the memory portion 11 (step S123).

Next, the portion 7 functions as the smoothing means 7f, ellipse separability calculating means 7g and estimating means 7h by the program 13b and detects a center position, major axis, minor axis and inclination angle of the ball image in the frame (step S124). The process in the step S124 is the same as that of the step S6 in a first exemplary embodiment.

Figure 29:
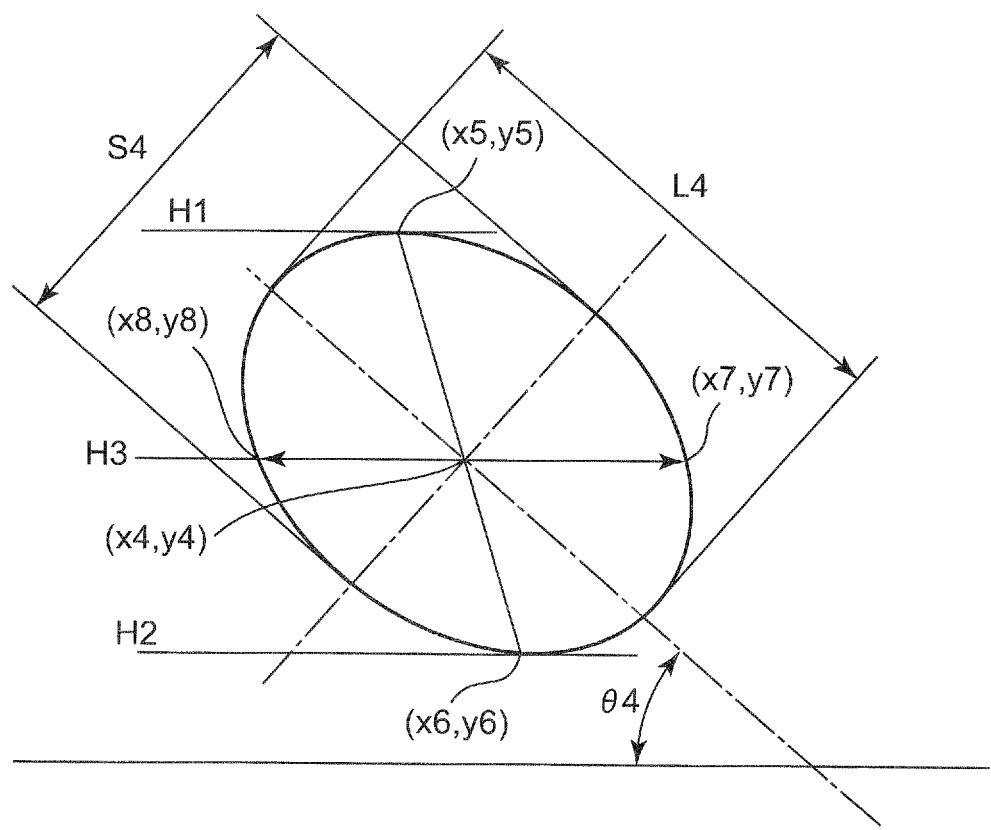
FIG. 29 is a drawing for explaining a principle for analyzing a movement of a ball.

The major axis, minor axis, center position and inclination angle that result in the maximum separability is designated as L4, S4, (x4, y4) and θ4, respectively, in the step S124 as shown in FIG. 29. The ellipse defined by the major axis L4, minor axis S4, center position (x4, y4) and inclination angle θ4 is designated as an optimum ellipse. The portion 7 may detect a frame at the impact before the process of step S124 as the case in a first exemplary embodiment (see step S3, FIGS. 7, 8 and 12, for example).

Next, the portion 7 calculates a speed of the ball 202 along the horizontal direction (x-direction) at the time point of capturing the frame (step S125) and calculates a speed of the ball 202 along the vertical direction (y-direction) at the time point of capturing the frame (step S126). The method will be explained in detail with reference to FIG. 29.

The portion 7 functions as a first intersection calculating means 7v by the program 13b and calculates a coordinates (x5, y5) of a tangent point between the optimum ellipse and a parallel tangent line H1 to the optimum ellipse. The portion also calculates a coordinates (x6, y6) of a tangent point between the optimum ellipse and the other parallel tangent line H2 to the optimum ellipse.

Next, the portion 7 plays a role as a second intersection calculating means 7w by the program 13b and calculates coordinates (x7, y7) and (x8, y8) of two intersection points of the optimum ellipse and a horizontal line H3 passing through the center position (x4, y4).

Next, the portion 7 functions as a speed calculating means 7x by the program 13b and calculates a horizontal speed of the ball 202 based on the following formula 21.

$$V_x = \frac{(x6 - x5) \times \frac{Bsize}{|x7 - x8|}}{(y6 - y5) \times Ld} \quad \text{(Formula 21)}$$

Where $V_x$ is a ball speed (mm/sec) in the horizontal direction, Bsize is an actual diameter (mm) of the ball and Ld is a delay time (sec) between neighboring horizontal lines picked up by the image sensor of the electronic image pickup portion 3. An absolute value of a difference of x7 and x8 can be estimated as a diameter of the ball image in the frame. The result of "(y6−y5)×Ld" is a time from a point of time of "exposure and electronic charge accumulation" of the horizontal tangent H1 to a point of time of "exposure and electronic charge accumulation" of the horizontal tangent H2.

Assuming that a still round ball image is captured, x5 is equal to x6. Therefore, a value of "x6−x5" divided by "(y6−y5)×Ld" can be estimated as a speed of the ball image in the frame. Thus the ball speed (mm/sec) in the horizontal direction can be calculated by the formula 21.

The portion 7 as the speed calculating means 7x calculates a vertical speed of the ball 202 based on the following formula 22.

$$V_y = \frac{(|x7 - x8| - (y6 - y5)) \times \frac{Bsize}{|x7 - x8|}}{(y6 - y5) \times Ld} \quad \text{(Formula 22)}$$

Where $V_y$ is a ball speed (mm/sec) in the vertical direction.

When picking up an image of a round ball moving upward, the image of the round ball is compressed in the vertical direction. Thus a value of an amount of compression of the line divided by the time between the lines is estimated as the speed.

The portion 7 functions as a vertical take-off angle calculating means 7y by the program 13b and calculates a vertical take-off angle α (rad) based on the following formula 23.

$$\tan\alpha = \frac{V_y}{V_x} \quad \text{(Formula 23)}$$

The portion 7 outputs the calculated speed and vertical take-off angle to the reader/writer 10 and the reader/writer 10 records the speed and vertical take-off angle in the memory portion 11. A picture indicating the calculated results by numeric values or illustrations may be displayed on the display portion 9 by the command from the portion 7 and the central control portion 14.

According to a second exemplary embodiment, it becomes possible to reduce calculation load because the speed and vertical take-off angle of the ball 202 can be calculated based on one frame after impact. In addition, because the major axis, minor axis, center position and inclination angle of the elliptical ball image can be calculated accurately by using an ellipse separability filter, the speed and vertical take-off angle of the ball 202 can be also calculated accurately.

(Variation)

The present invention is not limited to the exemplary embodiments above explained and the exemplary embodiments can be modified within the gist of the present invention.

For example, the structures of the imaging devices 100 and 100A shown in the first and second exemplary embodiments are mere examples and the present invention is not limited to them.

The image processing portion 7 realizes various functions of the means 7a to 7n, 7p, 7s to 7u, 7v to 7y by executing the programs 13a or 13b under the control of the central control portion 14 in the first and second exemplary embodiments. However, the present invention is not limited to that and it is possible to realize the functions of the means 7a to 7n, 7p, 7s to 7u, 7v to 7y by such a way that the central control portion 14 executes the program 13a or 13b stored in the program memory 13.

It is also possible to use a nonvolatile memory such as a flush memory, etc. or a removable memory medium such as a CD-ROM, etc. as well as a ROM or hard disk, etc. as a computer readable medium for storing a program to execute each process above explained. It is also possible to use a carrier wave as a medium for providing data for a program through specified communication line.

According to the above explanation, the multiple continuous images (continuous frames) stored in the memory portion 11 are captured by the image pickup means (lens unit 1, electronic image pickup portion 3, unit circuit 4 and image pickup controlling portion 5). However, it is possible to capture continuous images by an image pickup means (digital camera, for example) other than the image pickup means integrated in the imaging device 100 and store the continuous images in the memory portion 11 so as to process them by the image processing portion 7 as explained above.

The scope of the present invention is not limited to the exemplary embodiments above explained and includes the scope of the original claims as well as the present claims and equivalents thereof.

The entire disclosure of Japanese Patent Application No. 2011-172877 filed on Aug. 8, 2011 including specification, claims, drawings and summary are incorporated herein by reference in its entirety.

What is claimed is:

1. An imaging device comprising:
    an image pickup portion using a rolling shutter system,
    an image pickup controlling portion for controlling the image pickup portion so as to pickup at least two frame images by continuous image capturing, each of the images containing a ball image of a ball, the ball image being elliptically deformed,
    a degree-of-separation calculating portion for calculating a degree of separation of pixels by filtering the frame images captured by the image pickup controlling portion using an ellipse degree-of-separation filter having an inside region of an ellipse shape whose major axis is inclined with respect to a horizontal line and an outside region that is adjacent to the inside region, the degree of separation being calculated between the inside region and the outside region,
    an estimating portion for estimating a center position, major axis, minor axis and inclination angle of the inside region that results in a maximum degree-of-separation, obtained by the degree of separation calculating portion, by changing the center position, major axis, minor axis and inclination angle of the inside region, as a center position, major axis, minor axis and inclination angle of the ball images, and
    a state-value calculating portion for calculating a moving-state value of the ball based on each of values of the center position, major axis, minor axis or inclination angle, estimated by the estimating portion, of the ball images in the at least two frame images.

2. The imaging device of claim 1, wherein the state-value calculating portion comprises a speed calculating portion for calculating a speed of the ball based on a difference between the center positions of the ball images in the at least two frame images estimated by the estimating portion, a number of frames between the frame images and a frame rate.

3. The imaging device of claim 1, wherein the state-value calculating portion comprises a vertical take-off angle calculating portion for calculating a take-off angle of the ball in an upward or downward direction with respect to a horizontal plane based on a difference between the center positions of the ball images in the at least two frame images estimated by the estimating portion.

4. The imaging device of claim 1, wherein the state-value calculating portion comprises a horizontal take-off angle calculating portion for calculating a take-off angle of the ball in a right or left direction with respect to a plane orthogonal to an image pickup direction of the image pickup portion based on the major axis or minor axis of the ball images in the at least two frame images estimated by the estimating portion, a horizontal view angle of the image pickup portion, center coordinates of the frame images and a number of vertical lines of the frame images.

5. The imaging device of claim 1, wherein the estimating portion estimates the center position, major axis and minor axis of the inside region that results in a maximum degree of separation, obtained by the degree-of-separation calculating portion, by changing the center position, major axis and minor axis of the inside region while the inclination angle of the inside region is maintained, as the center position, major axis and minor axis of the ball images, and estimates the inclination angle of the inside region that results in a maximum degree of separation, obtained by the degree-of-separation calculating portion, by changing the inclination angle of the inside region while the center position, major axis and minor axis of the inside region are maintained, as the inclination angle of the ball images.

6. The imaging device of claim 1, further comprising:
    a deviation amount calculating portion for calculating a deviation in a horizontal direction between adjacent horizontal lines, the deviation being caused by a rolling shutter and calculated based on a horizontal difference of the center positions between the frame images estimated by the estimating portion,
    a deformation correction portion for correcting the deformed ball images in the frame images into a circle based on the deviation amount,
    a coordinate transforming portion for coordinates-converting the ball images corrected by the deformation correction portion onto a surface of a three-dimensional spherical model,
    a rotation angle estimating portion for estimating a rotation angle of the ball images between the frame images that are coordinates-converted by the coordinate transforming portion, and
    a spin speed calculating portion for calculating a spin speed of the ball based on the rotation angle estimated by the rotation angle estimating portion and the frame rate.

7. An imaging device comprising:
    an image pickup portion using a rolling shutter system,
    an image pickup controlling portion for controlling the image pickup portion so as to pickup a frame image by an image capturing, the frame image containing a ball image of a ball, the ball image being elliptically deformed,
    a degree-of-separation calculating portion for calculating a degree of separation of pixels by filtering the frame image captured by the image pickup controlling portion using an ellipse degree-of-separation filter having an inside region of an ellipse shape whose major axis is inclined with respect to a horizontal line and an outside region located adjacently and concentrically outside the inside region, the degree of separation being calculated between the inside region and the outside region,
    an estimating portion for estimating a center position, major axis, minor axis and inclination angle of the inside region that results in a maximum degree of separation, obtained by the degree-of-separation calculating portion by changing the center position, major axis, minor axis and inclination angle of the inside region, as a center position, major axis, minor axis and inclination angle of the ball image,
    a first intersection calculating portion for calculating positions of tangent points of an ellipse defined by the center position, major axis, minor axis and inclination angle estimated by the estimating portion with two parallel tangent lines that are in contact with the ellipse, a second intersection calculating portion for calculating intersection points between the ellipse and a horizontal line that passes through the center position of the ellipse estimated by the estimating portion, and a speed calculating portion for calculating a speed of the ball based on the positions of the tangent points and the intersection points calculated by the first and the second intersection calculating portions, a delay time between horizontal lines of a rolling shutter of the image pickup portion and an actual size of the ball.

8. A non-transitory computer-readable medium storing a program which causes a computer to perform functions comprising:

calculating a degree of separation of pixels by filtering at least two frame images, each image being continuously captured by an image pickup portion with a rolling shutter system and containing a moving ball image of a ball, the ball image being elliptically deformed, the filtering being performed using an ellipse degree-of-separation filter having an inside region of an ellipse shape whose major axis is inclined with respect to a horizontal line and an outside region that is adjacent to the inside region, the degree of separation being calculated between the inside region and the outside region, estimating a center position, major axis, minor axis and inclination angle of the inside region that results in a maximum degree of separation, obtained by the calculating of the degree-of-separation, by changing the center position, major axis, minor axis and inclination angle of the inside region, as a center position, major axis, minor axis and inclination angle of the ball images, and calculating a moving-state value of the ball based on each of values of the center position, major axis, minor axis and inclination angle, estimated in the estimating step, of the ball images in the at least two frame images.

9. A non-transitory computer-readable medium storing a program which causes a computer to perform functions comprising:

calculating a degree of separation of pixels by filtering a frame image captured by an image pickup portion with a rolling shutter system and containing a moving ball image of a ball, the ball image being elliptically deformed, the filtering being performed using an ellipse degree-of-separation filter having an inside region of an ellipse shape whose major axis is inclined with respect to a horizontal line and an outside region located adjacently and concentrically outside the inside region, the degree of separation being calculated between the inside region and the outside region, estimating a center position, major axis, minor axis and inclination angle of the inside region that results in a maximum degree of separation, obtained by the calculating of the degree-of-separation, by changing the center position, major axis, minor axis and inclination angle of the inside region, as a center position, major axis, minor axis and inclination angle of the ball image, calculating tangent points of an ellipse defined by the center position, major axis, minor axis and inclination angle estimated by the estimating step with two parallel tangent lines that are in contact with the ellipse, calculating intersection points between the ellipse and a horizontal line that passes through the center position of the ellipse estimated by the estimating step, and calculating a speed of the ball based on the positions of the calculated tangent points and the calculated intersection points a delay time between horizontal lines of a rolling shutter of the image pickup portion, and an actual size of the ball.

* * * * *